(12) United States Patent
Chen

(10) Patent No.: US 12,476,481 B2
(45) Date of Patent: Nov. 18, 2025

(54) UNINTERRUPTIBLE POWER SUPPLY

(71) Applicant: Huawei Digital Power Technologies Co., Ltd., Shenzhen (CN)

(72) Inventor: Gouyi Chen, Shenzhen (CN)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/758,260

(22) Filed: Jun. 28, 2024

(65) Prior Publication Data
US 2025/0007323 A1 Jan. 2, 2025

(30) Foreign Application Priority Data
Jun. 29, 2023 (CN) .................. 202310791899.2

(51) Int. Cl.
H02J 9/06 (2006.01)
(52) U.S. Cl.
CPC .................. H02J 9/062 (2013.01)
(58) Field of Classification Search
CPC ........................................... H02J 9/062
USPC ............................................. 307/64
See application file for complete search history.

(56) References Cited

U.S. PATENT DOCUMENTS 7,456,524 B2 * 11/2008 Nielsen ............... H02M 3/1584
307/82
2008/0197706 A1 * 8/2008 Nielsen ................. H02J 1/102
363/67

FOREIGN PATENT DOCUMENTS

CN 1909346 A 2/2007

* cited by examiner

Primary Examiner — Michael R. Fin
(74) Attorney, Agent, or Firm — Maier & Maier, PLLC

(57) ABSTRACT

An uninterruptible power supply. A rectifier of the uninterruptible power supply includes six first rectifier diodes, six second rectifier diodes, three alternating current side relays, six direct current side relays, a DC/DC conversion unit, and a controller. The other end of each alternating current side relay is connected to anodes of two first rectifier diodes, and cathodes of the two first rectifier diodes are respectively connected to two phases of positive input ends of the DC/DC conversion unit. The other end of each alternating current side relay is further connected to cathodes of two second rectifier diodes, and anodes of the two second rectifier diodes are respectively connected to two phases of negative input ends of the DC/DC conversion unit.

20 Claims, 11 Drawing Sheets

UNINTERRUPTIBLE POWER SUPPLY

CROSS-REFERENCE TO RELATED APPLICATION

This application claims priority to Chinese Patent Application No. 202310791899.2, filed on Jun. 29, 2023, which is hereby incorporated by reference in its entirety.

TECHNICAL FIELD

The embodiments relate to the field of power supply technologies and to an uninterruptible power supply.

BACKGROUND

An uninterruptible power supply (UPS) is a device that can provide continual electric power when a power grid voltage of a mains input end is interrupted or abnormal. This reduces a possibility of data damage or data loss of a device and prevents the device from stopping or failing.

An online UPS has two input ends: a mains input end and a battery input end. When an alternating current input voltage at the mains input end is abnormal, the UPS switches from a mains mode to a battery mode to continue supplying power to an alternating current load. The following describes an operating principle of the UPS with reference to FIG. 1. As shown in FIG. 1, the UPS includes a rectifier, an inverter, and a charger. When the UPS is in a mains mode, an alternating current supplied by an alternating current power grid flows into the rectifier through the mains input end of the rectifier. The rectifier converts the alternating current supplied by the alternating current power grid into a direct current and outputs the direct current to the inverter. The inverter converts the direct current into an alternating current and outputs the alternating current to an output end of the UPS. The alternating current supplied by the alternating current power grid is converted into a high-quality output voltage after two-level conversion. This prevents interference of input harmonic, burr, voltage transient, or the like from affecting a load. When a mains voltage is abnormal, the UPS controls a silicon controlled thyristor SCR in the rectifier to switch an energy input of the UPS from a mains input to a battery input. In this way, the UPS switches from the mains mode to a battery mode. When the UPS is in the battery mode, the UPS obtains a direct current from a battery connected to the battery input end of the UPS, where the direct current is converted into an alternating current by the inverter and then output to the output end of the UPS.

In the foregoing manner in which the UPS switches between the mains mode and the battery mode by controlling the SCR, there is no switch action delay, and an output voltage of the rectifier is stable in a switching process. However, an SCR loss is large, and an isolated drive circuit is needed for control, leading to high circuit costs.

SUMMARY

The embodiments provide an uninterruptible power supply to effectively reduce circuit costs of the uninterruptible power supply.

According to a first aspect, the embodiments provide an uninterruptible power supply. The uninterruptible power supply includes alternating current input ends, direct current input ends, a rectifier, an inverter, and an alternating current output end. The direct current input ends are configured to connect to a direct current power supply. The alternating current input ends are connected to three phases of alternating current input ends of the rectifier. The direct current input ends are connected to direct current input ends of the rectifier. An output end of the rectifier is connected to an input end of the inverter. An output end of the inverter is connected to the alternating current output end. The rectifier includes six first rectifier diodes, six second rectifier diodes, three alternating current side relays, six direct current side relays, a direct current/direct current (DC/DC) conversion unit, and a controller. Each of the three phases of alternating current input ends is connected to one end of one of the three alternating current side relays. The other end of each of the three alternating current side relays is connected to anodes of two first rectifier diodes, and cathodes of the two first rectifier diodes are respectively connected to two phases of positive input ends in three phases of positive input ends of the DC/DC conversion unit. Two first rectifier diodes connected to any alternating current side relay in the three alternating current side relays are different from two first rectifier diodes connected to each alternating current side relay in the three alternating current side relays other than the any alternating current side relay. Two phases of positive input ends of the DC/DC conversion unit that are connected to any alternating current side relay through two first rectifier diodes are different from two phases of positive input ends of the DC/DC conversion unit that are connected, through two first rectifier diodes, to each alternating current side relay in the three alternating current side relays other than the any alternating current side relay. The other end of each of the three alternating current side relays is further connected to cathodes of two second rectifier diodes, and anodes of the two second rectifier diodes are respectively connected to two phases of negative input ends in three phases of negative input ends of the DC/DC conversion unit. Two second rectifier diodes connected to any alternating current side relay are different from two second rectifier diodes connected to each alternating current side relay in the three alternating current side relays other than the any alternating current side relay. Two phases of negative input ends of the DC/DC conversion unit that are connected to any alternating current side relay through two second rectifier diodes are different from two phases of negative input ends of the DC/DC conversion unit that are connected, through two second rectifier diodes, to each alternating current side relay in the three alternating current side relays other than the any alternating current side relay. Each phase of input end in the three phases of positive input ends and the three phases of negative input ends of the DC/DC conversion unit is connected to the direct current input end of the rectifier through one direct current side relay, and an output end of the DC/DC conversion unit is connected to the output end of the rectifier. The controller is configured to: when a voltage of the three phases of alternating current input ends is abnormal, control the DC/DC conversion unit to stop operation, and control the three alternating current side relays to turn off; after controlling the three alternating current side relays to turn off for first preset duration, control the six direct current side relays to turn on; and after controlling the six direct current side relays to turn on for second preset duration, control the DC/DC conversion unit to resume operation. It may be understood that, each phase of alternating current input end of the rectifier in the uninterruptible power supply is connected to two phases of input ends of the DC/DC conversion unit through two rectifier diodes respectively, to implement interleaved parallel connection. This reduces an input current peak of the DC/DC conversion unit, reduces circuit costs of circuit elements in the DC/DC conversion unit, and reduces sizes of an input filter and an output filter of the rectifier, so that circuit costs of the uninterruptible power supply are reduced. In addition, the uninterruptible power supply uses a structure of a relay and a rectifier diode as a mode switching circuit. The mode switching circuit does not need an additional drive circuit, and a loss of the relay and the rectifier diode is relatively small. Therefore, circuit costs of the uninterruptible power supply can be further effectively reduced.

With reference to the first aspect, in a first possible implementation, the rectifier further includes a positive bus capacitor, a negative bus capacitor, and a charging circuit, and the output end of the DC/DC conversion unit includes a positive output end, a negative output end, and a neutral wire output end. The positive bus capacitor is connected between the positive output end and the neutral wire output end of the DC/DC conversion unit, and the negative bus capacitor is connected between the neutral wire output end and the negative output end of the DC/DC conversion unit. Input ends of the charging circuit are connected to the direct current input ends of the rectifier, output ends of the charging circuit are respectively connected to the positive output end and the negative output end of the DC/DC conversion unit, and the charging circuit is configured to control the direct current power supply to charge the positive bus capacitor and the negative bus capacitor. It may be understood that the charging circuit may control, in a process in which the uninterruptible power supply switches between a mains mode and a battery mode, the direct current power supply to charge the positive bus capacitor and the negative bus capacitor, to avoid a case in which an output voltage of the uninterruptible power supply is decreased by a load due to absence of energy input in the foregoing process in which the uninterruptible power supply switches between the two modes, and to further improve stability of the uninterruptible power supply during operation.

With reference to the first possible implementation of the first aspect, in a second possible implementation, the controller is further configured to: when the voltage of the three phases of alternating current input ends is abnormal, control the charging circuit to operate, to control the direct current power supply to charge the positive bus capacitor and the negative bus capacitor. The controller is further configured to: after controlling the DC/DC conversion unit to resume operation, which indicates that the uninterruptible power supply is in the battery mode, control the charging circuit to stop operation, to control the direct current power supply to stop charging the positive bus capacitor and the negative bus capacitor by using the charging circuit. It may be understood that, in a time period after the uninterruptible power supply detects that an alternating-current-power-grid voltage is abnormal and before the uninterruptible power supply is in the battery mode, the uninterruptible power supply controls the charging circuit to operate, so that the direct current power supply charges the positive bus capacitor and the negative bus capacitor, to avoid a case in which the output voltage of the uninterruptible power supply is decreased by the load due to absence of energy input in the foregoing process in which the uninterruptible power supply switches between the two modes, and to further improve stability of the uninterruptible power supply during operation.

With reference to any one of the first aspect to the second possible implementation of the first aspect, in a third possible implementation, the controller is configured to: after controlling the DC/DC conversion unit to stop operation, when an input current of the DC/DC conversion unit is less than or equal to a preset current threshold, control the three alternating current side relays to turn off. In this way, it is ensured that the three alternating current side relays operate when a current value flowing into the three alternating current side relays does not generate an electric arc, so that safety of the relays during operation is improved and service lives of the relays are prolonged.

With reference to any one of the first possible implementation of the first aspect to the third possible implementation of the first aspect, in a fourth possible implementation, the controller is further configured to: when the voltage of the three phases of alternating current input ends recovers, control the DC/DC conversion unit to stop operation, and control the six direct current side relays to turn off; after controlling the six direct current side relays to turn off for third preset duration, control the three alternating current side relays to turn on; and after controlling the three alternating current side relays to turn on for fourth preset duration, control the DC/DC conversion unit to resume operation, so that the uninterruptible power supply restores to the mains mode. It may be understood that, the uninterruptible power supply may control operation states of the six direct current side relays and the three alternating current side relays, so that the uninterruptible power supply can restore to the mains mode from the battery mode when the alternating-current-power-grid voltage recovers. A control manner is simple and easy to operate.

With reference to the fourth possible implementation of the first aspect, in a fifth possible implementation, the controller is further configured to: when the voltage of the three phases of alternating current input ends recovers, control the charging circuit to operate, to control the direct current power supply to charge the positive bus capacitor and the negative bus capacitor. The controller is further configured to: after controlling the DC/DC conversion unit to resume operation, control the charging circuit to stop operation, to control the direct current power supply to stop charging the positive bus capacitor and the negative bus capacitor by using the charging circuit. It may be understood that, in a time period after the uninterruptible power supply detects that the alternating-current-power-grid voltage recovers and before the uninterruptible power supply restores to the mains mode, the uninterruptible power supply controls the charging circuit to operate, so that the direct current power supply charges the positive bus capacitor and the negative bus capacitor, to avoid a case in which the output voltage of the uninterruptible power supply is decreased by the load due to absence of energy input in the foregoing process in which the uninterruptible power supply switches between the two modes, and to further improve stability of the uninterruptible power supply during operation.

With reference to the fourth possible implementation of the first aspect or the fifth possible implementation of the first aspect, in a sixth possible implementation, the controller is configured to: after controlling the DC/DC conversion unit to stop operation, when the input current of the DC/DC conversion unit is less than or equal to the preset current threshold, control the six direct current side relays to turn off. In this way, it is ensured that the six direct current side relays operate when a current value flowing into the six direct current side relays does not generate an electric arc, so that safety of the relays during operation is improved and service lives of the relays are prolonged.

With reference to any one of the second possible implementation of the first aspect to the sixth possible implementation of the first aspect, in a seventh possible implementation, the charging circuit includes a first inductor, a second inductor, a first switching transistor, a second switching transistor, a third switching transistor, and a first capacitor. The input end of the charging circuit includes a positive input end and a negative input end. The output ends of the charging circuit include a positive output end and a negative output end. The direct current input ends of the rectifier include a positive direct current input end and a negative direct current input end. The positive input end and the negative input end of the charging circuit are respectively connected to the positive direct current input end and the negative direct current input end of the rectifier. The first switching transistor, the second switching transistor, and the third switching transistor are sequentially connected in series between the positive output end and the negative output end of the charging circuit. One end of the first inductor is connected to the positive input end of the charging circuit, and the other end of the first inductor is connected to a position at which the first switching transistor and the second switching transistor are connected in series. One end of the second inductor is connected to the negative input end of the charging circuit, and the other end of the second inductor is connected to a position at which the second switching transistor and the third switching transistor are connected in series. The first capacitor is connected between the positive input end and the negative input end of the charging circuit. It may be understood that the charging circuit provided in this implementation is applicable to a circuit structure in which a quantity of direct current input ends of the uninterruptible power supply is 2.

With reference to the seventh possible implementation of the first aspect, in an eighth possible implementation, the controller is configured to: in each operation period of the charging circuit, after controlling the second switching transistor to turn on for fifth preset duration, control the second switching transistor to turn off for sixth preset duration, to control the charging circuit to operate, where the fifth preset duration and the sixth preset duration form one operation period of the charging circuit. It may be understood that the uninterruptible power supply may control the charging circuit by controlling an operation state of a controllable switching transistor in the charging circuit. A control manner is simple and easy to operate.

With reference to any one of the second possible implementation of the first aspect to the sixth possible implementation of the first aspect, in a ninth possible implementation, the charging circuit includes a first inductor, a second inductor, a first switching transistor, a second switching transistor, a third switching transistor, a fourth switching transistor, a first capacitor, and a second capacitor. The input ends of the charging circuit include a positive input end, a negative input end, and a neutral wire input end. The output ends of the charging circuit include a positive output end and a negative output end. The direct current input ends of the rectifier include a positive direct current input end, a negative direct current input end, and a neutral wire direct current input end. The positive input end, the negative input end, and the neutral wire input end of the charging circuit are respectively connected to the positive direct current input end, the negative direct current input end, and the neutral wire direct current input end of the rectifier. The first switching transistor, the second switching transistor, the third switching transistor, and the fourth switching transistor are sequentially connected in series between the positive output end and the negative output end of the charging circuit. One end of the first inductor is connected to the positive input end of the charging circuit, and the other end of the first inductor is connected to a position at which the first switching transistor and the second switching transistor are connected in series. One end of the second inductor is connected to the negative input end of the charging circuit, and the other end of the second inductor is connected to a position at which the third switching transistor and the fourth switching transistor are connected in series. The first capacitor is connected between the positive input end and the neutral wire input end of the charging circuit, and the second capacitor is connected between the neutral wire input end and the negative input end of the charging circuit. The neutral wire input end of the charging circuit is connected to a position at which the second switching transistor and the third switching transistor are connected in series, and to the neutral wire output end of the DC/DC conversion unit. It may be understood that the charging circuit provided in this implementation is applicable to a circuit structure in which a quantity of direct current input ends of the uninterruptible power supply is 3. The variety of structures of the charging circuit contributes to the variety of structures of the uninterruptible power supply and high flexibility.

With reference to the ninth possible implementation of the first aspect, in a tenth possible implementation, the controller is configured to: in each operation period of the charging circuit, control the second switching transistor to turn on for fifth preset duration and then to turn off for sixth preset duration, and control the third switching transistor to turn on for seventh preset duration and then to turn off for eighth preset duration, to control the charging circuit to operate. One operation period of the charging circuit includes the fifth preset duration and the sixth preset duration, or includes the seventh preset duration and the eighth preset duration. It may be understood that the uninterruptible power supply may control the charging circuit by controlling an operation state of a controllable switching transistor in the charging circuit. A control manner is simple and easy to operate.

With reference to any one of the first aspect to the tenth possible implementation of the first aspect, in an eleventh possible implementation, the DC/DC conversion unit includes three first DC/DC circuits and three second DC/DC circuits. An output end of the DC/DC conversion unit includes a positive output end, a negative output end, and a neutral wire output end. Three input ends of the three first DC/DC circuits are respectively connected to the three phases of positive input ends of the DC/DC conversion unit, and three input ends of the three second DC/DC circuits are respectively connected to the three phases of negative input ends of the DC/DC conversion unit. A positive output end and a negative output end of the first DC/DC circuit are respectively connected to the positive output end and the neutral wire output end of the DC/DC conversion unit, and a positive output end and a negative output end of the second DC/DC circuit are respectively connected to the neutral wire output end and the negative output end of the DC/DC conversion unit.

With reference to the eleventh possible implementation of the first aspect, in a twelfth possible implementation, the first DC/DC circuit includes a third inductor, a fifth switching transistor, and a first diode, and the second DC/DC circuit includes a fourth inductor, a sixth switching transistor, and a second diode. A first end of the fifth switching transistor is connected to one end of the third inductor and an anode of the first diode. The other end of the third inductor and a cathode of the first diode are respectively connected to the input end and the positive output end of the first DC/DC circuit. A second end of the fifth switching transistor is connected to the negative output end of the first DC/DC circuit. A first end of the sixth switching transistor is connected to the positive output end of the second DC/DC circuit. A second end of the sixth switching transistor is connected to one end of the fourth inductor and a cathode of the second diode. The other end of the fourth inductor and an anode of the second diode are respectively connected to the input end and the negative output end of the second DC/DC circuit.

According to a second aspect, the embodiments provide an uninterruptible power supply (UPS). The uninterruptible power supply includes alternating current input ends, direct current input ends, a rectifier, an inverter, and an alternating current output end. The direct current input ends are configured to connect to a direct current power supply. The alternating current input ends are connected to three phases of alternating current input ends of the rectifier. The direct current input ends are connected to direct current input ends of the rectifier. An output end of the rectifier is connected to an input end of the inverter. An output end of the inverter is connected to the alternating current output end. The rectifier includes three first rectifier diodes, three second rectifier diodes, three alternating current side relays, six direct current side relays, a DC/DC conversion unit, a positive bus capacitor, a negative bus capacitor, a charging circuit, and a controller. Each of the three phases of alternating current input ends is connected to one end of one of the three alternating current side relays. The other end of each of the three alternating current side relays is connected to an anode of one first rectifier diode, and a cathode of the one first rectifier diode is connected to one phase of positive input end in three phases of positive input ends of the DC/DC conversion unit. One first rectifier diode connected to any alternating current side relay in the three alternating current side relays is different from one first rectifier diode connected to each alternating current side relay in the three alternating current side relays other than the any alternating current side relay. One phase of positive input end of the DC/DC conversion unit that is connected to any alternating current side relay through one first rectifier diode is different from one phase of positive input end of the DC/DC conversion unit that is connected to each alternating current side relay in the three alternating current side relays other than the any alternating current side relay. The other end of each of the three alternating current side relays is further connected to a cathode of one second rectifier diode, and an anode of the one second rectifier diode is connected to one phase of negative input end in the three phases of negative input ends of the DC/DC conversion unit. One second rectifier diode connected to any alternating current side relay is different from one second rectifier diode connected to each alternating current side relay in the three alternating current side relays other than the any alternating current side relay. One phase of negative input end of the DC/DC conversion unit that is connected to any alternating current side relay through one second rectifier diode is different from one phase of negative input end of the DC/DC conversion unit that is connected to each alternating current side relay in the three alternating current side relays other than the any alternating current side relay. Each phase of input end in the three phases of positive input ends and the three phases of negative input ends of the DC/DC conversion unit is connected to the direct current input end of the rectifier through one direct current side relay, and a positive output end, a negative output end, and a neutral wire output end of the DC/DC conversion unit each are connected to the output end of the rectifier. The positive bus capacitor is connected between the positive output end and the neutral wire output end of the DC/DC conversion unit, and the negative bus capacitor is connected between the neutral wire output end and the negative output end of the DC/DC conversion unit. The charging circuit is configured to control the direct current power supply to charge the positive bus capacitor and the negative bus capacitor. The controller is configured to: when a voltage of the three phases of alternating current input ends is abnormal, control the charging circuit to operate and the DC/DC conversion unit to stop operation, and control the three alternating current side relays to turn off; after controlling the three alternating current side relays to turn off for first preset duration, control the six direct current side relays to turn on; and after controlling the six direct current side relays to turn on for second preset duration, control the DC/DC conversion unit to resume operation, and control the charging circuit to stop operation. The uninterruptible power supply controls the original charging circuit to perform reverse charging on the positive bus capacitor and the negative bus capacitor, so that an output voltage of the uninterruptible power supply is not decreased by a load in a process in which the uninterruptible power supply switches between a mains mode and a battery mode, and stability of the uninterruptible power supply during power supply is improved. Compared with a manner in which a quantity of bus capacitors is increased to avoid a drop of the output voltage of the uninterruptible power supply, a manner, provided in the embodiments, in which the charging circuit performs reverse charging to avoid a drop of the output voltage of the uninterruptible power supply can further reduce circuit costs and a volume of the uninterruptible power supply.

With reference to the second aspect, in a first possible implementation, the controller is configured to: after controlling the DC/DC conversion unit to stop operation, when an input current of the DC/DC conversion unit is less than or equal to a preset current threshold, control the three alternating current side relays to turn off. In this way, it is ensured that the three alternating current side relays operate when a current value flowing into the three alternating current side relays does not generate an electric arc, so that safety of the relays during operation is improved and service lives of the relays are prolonged.

With reference to the second aspect or the first possible implementation of the second aspect, in a second possible implementation, the controller is configured to: when the voltage of the three phases of alternating current input ends recovers, control the charging circuit to operate and the DC/DC conversion unit to stop operation, and control the six direct current side relays to turn off; after controlling the six direct current side relays to turn off for third preset duration, control the three alternating current side relays to turn on; and after controlling the three alternating current side relays to turn on for fourth preset duration, control the DC/DC conversion unit to resume operation, and control the charging circuit to stop operation. It may be understood that, in a time period after the uninterruptible power supply detects that the alternating-current-power-grid voltage recovers and before the uninterruptible power supply restores to the mains mode, the uninterruptible power supply controls the charging circuit to operate, so that the direct current power supply charges the positive bus capacitor and the negative bus capacitor, to avoid a case in which the output voltage of the uninterruptible power supply is decreased by the load due to absence of energy input in the foregoing process in which the uninterruptible power supply switches between the two modes, and to further improve stability of the uninterruptible power supply during operation.

With reference to the second possible implementation of the second aspect, in a third possible implementation, the controller is configured to: after controlling the DC/DC conversion unit to stop operation, when the input current of the DC/DC conversion unit is less than or equal to the preset current threshold, control the six direct current side relays to turn off. In this way, it is ensured that the six direct current side relays operate when a current value flowing into the six direct current side relays does not generate an electric arc, so that safety of the relays during operation is improved and service lives of the relays are prolonged.

With reference to any one of the second aspect to the third possible implementation of the second aspect, in a fourth possible implementation, input ends of the charging circuit are connected to the direct current input ends of the rectifier, and output ends of the charging circuit are respectively connected to the positive output end and the negative output end of the DC/DC conversion unit. The charging circuit includes a first inductor, a second inductor, a first switching transistor, a second switching transistor, a third switching transistor, and a first capacitor. The input end of the charging circuit includes a positive input end and a negative input end. The output ends of the charging circuit include a positive output end and a negative output end. The direct current input ends of the rectifier include a positive direct current input end and a negative direct current input end. The positive input end and the negative input end of the charging circuit are respectively connected to the positive direct current input end and the negative direct current input end of the rectifier. The first switching transistor, the second switching transistor, and the third switching transistor are sequentially connected in series between the positive output end and the negative output end of the charging circuit. One end of the first inductor is connected to the positive input end of the charging circuit, and the other end of the first inductor is connected to a position at which the first switching transistor and the second switching transistor are connected in series. One end of the second inductor is connected to the negative input end of the charging circuit, and the other end of the second inductor is connected to a position at which the second switching transistor and the third switching transistor are connected in series. The first capacitor is connected between the positive input end and the negative input end of the charging circuit. It may be understood that the charging circuit provided in this implementation is applicable to a circuit structure in which a quantity of direct current input ends of the uninterruptible power supply is 2.

With reference to the fourth possible implementation of the second aspect, in a fifth possible implementation, the controller is configured to: in each operation period of the charging circuit, after controlling the second switching transistor to turn on for fifth preset duration, control the second switching transistor to turn off for sixth preset duration, to control the charging circuit to operate, where the fifth preset duration and the sixth preset duration form one operation period of the charging circuit. It may be understood that the uninterruptible power supply may control the charging circuit by controlling an operation state of a controllable switching transistor in the charging circuit. A control manner is simple and easy to operate.

With reference to any one of the second aspect to the third possible implementation of the second aspect, in a sixth possible implementation, the charging circuit includes a first inductor, a second inductor, a first switching transistor, a second switching transistor, a third switching transistor, a fourth switching transistor, a first capacitor, and a second capacitor. The input ends of the charging circuit include a positive input end, a negative input end, and a neutral wire input end. The output ends of the charging circuit include a positive output end and a negative output end. The direct current input ends of the rectifier include a positive direct current input end, a negative direct current input end, and a neutral wire direct current input end. The positive input end, the negative input end, and the neutral wire input end of the charging circuit are respectively connected to the positive direct current input end, the negative direct current input end, and the neutral wire direct current input end of the rectifier. The first switching transistor, the second switching transistor, the third switching transistor, and the fourth switching transistor are sequentially connected in series between the positive output end and the negative output end of the charging circuit. One end of the first inductor is connected to the positive input end of the charging circuit, and the other end of the first inductor is connected to a position at which the first switching transistor and the second switching transistor are connected in series. One end of the second inductor is connected to the negative input end of the charging circuit, and the other end of the second inductor is connected to a position at which the third switching transistor and the fourth switching transistor are connected in series. The first capacitor is connected between the positive input end and the neutral wire input end of the charging circuit, and the second capacitor is connected between the neutral wire input end and the negative input end of the charging circuit. The neutral wire input end of the charging circuit is connected to a position at which the second switching transistor and the third switching transistor are connected in series, and to the neutral wire output end of the DC/DC conversion unit. It may be understood that the charging circuit provided in this implementation is applicable to a circuit structure in which a quantity of direct current input ends of the uninterruptible power supply is 3. The variety of structures of the charging circuit contributes to the variety of structures of the uninterruptible power supply and high flexibility.

With reference to the sixth possible implementation of the second aspect, in a seventh possible implementation, the controller is configured to: in each operation period of the charging circuit, control the second switching transistor to turn on for fifth preset duration and then to turn off for sixth preset duration, and control the third switching transistor to turn on for seventh preset duration and then to turn off for eighth preset duration, to control the charging circuit to operate. One operation period of the charging circuit includes the fifth preset duration and the sixth preset duration, or includes the seventh preset duration and the eighth preset duration. It may be understood that the uninterruptible power supply may control the charging circuit by controlling an operation state of a controllable switching transistor in the charging circuit. A control manner is simple and easy to operate.

With reference to any one of the second aspect to the seventh possible implementation of the second aspect, in an eighth possible implementation, the DC/DC conversion unit includes three first DC/DC circuits and three second DC/DC circuits. An output end of the DC/DC conversion unit includes a positive output end, a negative output end, and a neutral wire output end. Three input ends of the three first DC/DC circuits are respectively connected to the three phases of positive input ends of the DC/DC conversion unit, and three input ends of the three second DC/DC circuits are respectively connected to the three phases of negative input ends of the DC/DC conversion unit. A positive output end and a negative output end of the first DC/DC circuit are respectively connected to the positive output end and the neutral wire output end of the DC/DC conversion unit, and a positive output end and a negative output end of the second DC/DC circuit are respectively connected to the neutral wire output end and the negative output end of the DC/DC conversion unit.

With reference to the eighth possible implementation of the second aspect, in a ninth possible implementation, the first DC/DC circuit includes a third inductor, a fifth switching transistor, and a first diode, and the second DC/DC circuit includes a fourth inductor, a sixth switching transistor, and a second diode. A first end of the fifth switching transistor is connected to one end of the third inductor and an anode of the first diode. The other end of the third inductor and a cathode of the first diode are respectively connected to the input end and the positive output end of the first DC/DC circuit. A second end of the fifth switching transistor is connected to the negative output end of the first DC/DC circuit. A first end of the sixth switching transistor is connected to the positive output end of the second DC/DC circuit. A second end of the sixth switching transistor is connected to one end of the fourth inductor and a cathode of the second diode. The other end of the fourth inductor and an anode of the second diode are respectively connected to the input end and the negative output end of the second DC/DC circuit.

According to a third aspect, the embodiments provide a rectifier. Three phases of alternating current input ends of the rectifier are connected to an alternating current power grid. Direct current input ends of the rectifier are connected to a direct current power supply. The rectifier includes six first rectifier diodes, six second rectifier diodes, three alternating current side relays, six direct current side relays, a DC/DC conversion unit, and a controller. Each of the three phases of alternating current input ends is connected to one end of one of the three alternating current side relays. The other end of each of the three alternating current side relays is connected to anodes of two first rectifier diodes, and cathodes of the two first rectifier diodes are respectively connected to two phases of positive input ends in three phases of positive input ends of the DC/DC conversion unit. Two first rectifier diodes connected to any alternating current side relay in the three alternating current side relays are different from two first rectifier diodes connected to each alternating current side relay in the three alternating current side relays other than the any alternating current side relay. Two phases of positive input ends of the DC/DC conversion unit that are connected to any alternating current side relay through two first rectifier diodes are different from two phases of positive input ends of the DC/DC conversion unit that are connected, through two first rectifier diodes, to each alternating current side relay in the three alternating current side relays other than the any alternating current side relay. The other end of each of the three alternating current side relays is further connected to cathodes of two second rectifier diodes, and anodes of the two second rectifier diodes are respectively connected to two phases of negative input ends in three phases of negative input ends of the DC/DC conversion unit. Two second rectifier diodes connected to any alternating current side relay are different from two second rectifier diodes connected to each alternating current side relay in the three alternating current side relays other than the any alternating current side relay. Two phases of negative input ends of the DC/DC conversion unit that are connected to any alternating current side relay through two second rectifier diodes are different from two phases of negative input ends of the DC/DC conversion unit that are connected, through two second rectifier diodes, to each alternating current side relay in the three alternating current side relays other than the any alternating current side relay. Each phase of input end in the three phases of positive input ends and the three phases of negative input ends of the DC/DC conversion unit is connected to the direct current input end of the rectifier through one direct current side relay, and an output end of the DC/DC conversion unit is connected to the output end of the rectifier. The controller is configured to: when a voltage of the three phases of alternating current input ends is abnormal, control the DC/DC conversion unit to stop operation, and control the three alternating current side relays to turn off; after controlling the three alternating current side relays to turn off for first preset duration, control the six direct current side relays to turn on; and after controlling the six direct current side relays to turn on for second preset duration, control the DC/DC conversion unit to resume operation. It may be understood that, each phase of alternating current input end of the rectifier is connected to two phases of input ends of the DC/DC conversion unit through two rectifier diodes respectively, to implement interleaved parallel connection. This reduces an input current peak of the DC/DC conversion unit, reduces circuit costs of circuit elements in the DC/DC conversion unit, and reduces sizes of an input filter and an output filter of the rectifier, so that circuit costs of the rectifier are reduced. In addition, the rectifier uses a structure of a relay and a rectifier diode as a mode switching circuit. The mode switching circuit does not need an additional drive circuit, and a loss of the relay and the rectifier diode is relatively small. Therefore, circuit costs of the rectifier can be further effectively reduced.

With reference to the third aspect, in a first possible implementation, the rectifier further includes a positive bus capacitor, a negative bus capacitor, and a charging circuit, and the output end of the DC/DC conversion unit includes a positive output end, a negative output end, and a neutral wire output end. The positive bus capacitor is connected between the positive output end and the neutral wire output end of the DC/DC conversion unit, and the negative bus capacitor is connected between the neutral wire output end and the negative output end of the DC/DC conversion unit. Input ends of the charging circuit are connected to the direct current input ends of the rectifier, output ends of the charging circuit are respectively connected to the positive output end and the negative output end of the DC/DC conversion unit, and the charging circuit is configured to control the direct current power supply to charge the positive bus capacitor and the negative bus capacitor. It may be understood that the charging circuit may control, in a process in which the rectifier switches between a mains mode and a battery mode, the direct current power supply to charge the positive bus capacitor and the negative bus capacitor, to avoid a case in which an output voltage of the rectifier is decreased by a load due to absence of energy input in the foregoing process in which the rectifier switches between the two modes, and to further improve stability of the rectifier during operation.

With reference to the first possible implementation of the third aspect, in a second possible implementation, the controller is further configured to: when the voltage of the three phases of alternating current input ends is abnormal, control the charging circuit to operate, to control the direct current power supply to charge the positive bus capacitor and the negative bus capacitor. The controller is further configured to: after controlling the DC/DC conversion unit to resume operation, which indicates that the rectifier is in the battery mode, control the charging circuit to stop operation, to control the direct current power supply to stop charging the positive bus capacitor and the negative bus capacitor by using the charging circuit. It may be understood that, in a time period after the rectifier detects that an alternating-current-power-grid voltage is abnormal and before the rectifier is in the battery mode, the rectifier controls the charging circuit to operate, so that the direct current power supply charges the positive bus capacitor and the negative bus capacitor, to avoid a case in which the output voltage of the rectifier is decreased by the load due to absence of energy input in the foregoing process in which the rectifier switches between the two modes, and to further improve stability of the rectifier during operation.

With reference to any one of the third aspect to the second possible implementation of the first aspect, in a third possible implementation, the controller is configured to: after controlling the DC/DC conversion unit to stop operation, when an input current of the DC/DC conversion unit is less than or equal to a preset current threshold, control the three alternating current side relays to turn off. In this way, it is ensured that the three alternating current side relays operate when a current value flowing into the three alternating current side relays does not generate an electric arc, so that safety of the relays during operation is improved and service lives of the relays are prolonged.

With reference to any one of the first possible implementation of the third aspect to the third possible implementation of the third aspect, in a fourth possible implementation, the controller is further configured to: when the voltage of the three phases of alternating current input ends recovers, control the DC/DC conversion unit to stop operation, and control the six direct current side relays to turn off; after controlling the six direct current side relays to turn off for third preset duration, control the three alternating current side relays to turn on; and after controlling the three alternating current side relays to turn on for fourth preset duration, control the DC/DC conversion unit to resume operation, so that the rectifier restores to the mains mode. It may be understood that, the rectifier may control operation states of the six direct current side relays and the three alternating current side relays, so that the rectifier can restore to the mains mode from the battery mode when the alternating-current-power-grid voltage recovers. A control manner is simple and easy to operate.

With reference to the fourth possible implementation of the third aspect, in a fifth possible implementation, the controller is further configured to: when the voltage of the three phases of alternating current input ends recovers, control the charging circuit to operate, to control the direct current power supply to charge the positive bus capacitor and the negative bus capacitor. The controller is further configured to: after controlling the DC/DC conversion unit to resume operation, control the charging circuit to stop operation, to control the direct current power supply to stop charging the positive bus capacitor and the negative bus capacitor by using the charging circuit. It may be understood that, in a time period after the rectifier detects that the alternating-current-power-grid voltage recovers and before the rectifier restores to the mains mode, the rectifier controls the charging circuit to operate, so that the direct current power supply charges the positive bus capacitor and the negative bus capacitor, to avoid a case in which the output voltage of the rectifier is decreased by the load due to absence of energy input in the foregoing process in which the rectifier switches between the two modes, and to further improve stability of the rectifier during operation.

With reference to the fourth possible implementation of the third aspect or the fifth possible implementation of the third aspect, in a sixth possible implementation, the controller is configured to: after controlling the DC/DC conversion unit to stop operation, when the input current of the DC/DC conversion unit is less than or equal to the preset current threshold, control the six direct current side relays to turn off. In this way, it is ensured that the six direct current side relays operate when a current value flowing into the six direct current side relays does not generate an electric arc, so that safety of the relays during operation is improved and service lives of the relays are prolonged.

With reference to any one of the second possible implementation of the third aspect to the sixth possible implementation of the third aspect, in a seventh possible implementation, the charging circuit includes a first inductor, a second inductor, a first switching transistor, a second switching transistor, a third switching transistor, and a first capacitor. The input end of the charging circuit includes a positive input end and a negative input end. The output ends of the charging circuit include a positive output end and a negative output end. The direct current input ends of the rectifier include a positive direct current input end and a negative direct current input end. The positive input end and the negative input end of the charging circuit are respectively connected to the positive direct current input end and the negative direct current input end of the rectifier. The first switching transistor, the second switching transistor, and the third switching transistor are sequentially connected in series between the positive output end and the negative output end of the charging circuit. One end of the first inductor is connected to the positive input end of the charging circuit, and the other end of the first inductor is connected to a position at which the first switching transistor and the second switching transistor are connected in series. One end of the second inductor is connected to the negative input end of the charging circuit, and the other end of the second inductor is connected to a position at which the second switching transistor and the third switching transistor are connected in series. The first capacitor is connected between the positive input end and the negative input end of the charging circuit. It may be understood that the charging circuit provided in this implementation is applicable to a circuit structure in which a quantity of direct current input ends of the rectifier is 2.

With reference to the seventh possible implementation of the third aspect, in an eighth possible implementation, the controller is configured to: in each operation period of the charging circuit, after controlling the second switching transistor to turn on for fifth preset duration, control the second switching transistor to turn off for sixth preset duration, to control the charging circuit to operate, where the fifth preset duration and the sixth preset duration form one operation period of the charging circuit. It may be understood that the rectifier may control the charging circuit by controlling an operation state of a controllable switching transistor in the charging circuit. A control manner is simple and easy to operate.

With reference to any one of the second possible implementation of the third aspect to the sixth possible implementation of the third aspect, in a ninth possible implementation, the charging circuit includes a first inductor, a second inductor, a first switching transistor, a second switching transistor, a third switching transistor, a fourth switching transistor, a first capacitor, and a second capacitor. The input ends of the charging circuit include a positive input end, a negative input end, and a neutral wire input end. The output ends of the charging circuit include a positive output end and a negative output end. The direct current input ends of the rectifier include a positive direct current input end, a negative direct current input end, and a neutral wire direct current input end. The positive input end, the negative input end, and the neutral wire input end of the charging circuit are respectively connected to the positive direct current input end, the negative direct current input end, and the neutral wire direct current input end of the rectifier. The first switching transistor, the second switching transistor, the third switching transistor, and the fourth switching transistor are sequentially connected in series between the positive output end and the negative output end of the charging circuit. One end of the first inductor is connected to the positive input end of the charging circuit, and the other end of the first inductor is connected to a position at which the first switching transistor and the second switching transistor are connected in series. One end of the second inductor is connected to the negative input end of the charging circuit, and the other end of the second inductor is connected to a position at which the third switching transistor and the fourth switching transistor are connected in series. The first capacitor is connected between the positive input end and the neutral wire input end of the charging circuit, and the second capacitor is connected between the neutral wire input end and the negative input end of the charging circuit. The neutral wire input end of the charging circuit is connected to a position at which the second switching transistor and the third switching transistor are connected in series, and to the neutral wire output end of the DC/DC conversion unit. It may be understood that the charging circuit provided in this implementation is applicable to a circuit structure in which a quantity of direct current input ends of the rectifier is 3. The variety of structures of the charging circuit contributes to the variety of structures of the rectifier and high flexibility.

With reference to the ninth possible implementation of the third aspect, in a tenth possible implementation, the controller is configured to: in each operation period of the charging circuit, control the second switching transistor to turn on for fifth preset duration and then to turn off for sixth preset duration, and control the third switching transistor to turn on for seventh preset duration and then to turn off for eighth preset duration, to control the charging circuit to operate. One operation period of the charging circuit includes the fifth preset duration and the sixth preset duration, or includes the seventh preset duration and the eighth preset duration. It may be understood that the rectifier may control the charging circuit by controlling an operation state of a controllable switching transistor in the charging circuit. A control manner is simple and easy to operate.

With reference to any one of the third aspect to the tenth possible implementation of the third aspect, in an eleventh possible implementation, the DC/DC conversion unit includes three first DC/DC circuits and three second DC/DC circuits. An output end of the DC/DC conversion unit includes a positive output end, a negative output end, and a neutral wire output end. Three input ends of the three first DC/DC circuits are respectively connected to the three phases of positive input ends of the DC/DC conversion unit, and three input ends of the three second DC/DC circuits are respectively connected to the three phases of negative input ends of the DC/DC conversion unit. A positive output end and a negative output end of the first DC/DC circuit are respectively connected to the positive output end and the neutral wire output end of the DC/DC conversion unit, and a positive output end and a negative output end of the second DC/DC circuit are respectively connected to the neutral wire output end and the negative output end of the DC/DC conversion unit.

With reference to the eleventh possible implementation of the third aspect, in a twelfth possible implementation, the first DC/DC circuit includes a third inductor, a fifth switching transistor, and a first diode, and the second DC/DC circuit includes a fourth inductor, a sixth switching transistor, and a second diode. A first end of the fifth switching transistor is connected to one end of the third inductor and an anode of the first diode. The other end of the third inductor and a cathode of the first diode are respectively connected to the input end and the positive output end of the first DC/DC circuit. A second end of the fifth switching transistor is connected to the negative output end of the first DC/DC circuit. A first end of the sixth switching transistor is connected to the positive output end of the second DC/DC circuit. A second end of the sixth switching transistor is connected to one end of the fourth inductor and a cathode of the second diode. The other end of the fourth inductor and an anode of the second diode are respectively connected to the input end and the negative output end of the second DC/DC circuit.

According to a fourth aspect, the embodiments provide a rectifier. Three phases of alternating current input ends of the rectifier are connected to an alternating current power grid. Direct current input ends of the rectifier are connected to a direct current power supply. The rectifier includes three first rectifier diodes, three second rectifier diodes, three alternating current side relays, six direct current side relays, a DC/DC conversion unit, a positive bus capacitor, a negative bus capacitor, a charging circuit, and a controller. Each of the three phases of alternating current input ends is connected to one end of one of the three alternating current side relays. The other end of each of the three alternating current side relays is connected to an anode of one first rectifier diode, and a cathode of the one first rectifier diode is connected to one phase of positive input end in three phases of positive input ends of the DC/DC conversion unit. One first rectifier diode connected to any alternating current side relay in the three alternating current side relays is different from one first rectifier diode connected to each alternating current side relay in the three alternating current side relays other than the any alternating current side relay. One phase of positive input end of the DC/DC conversion unit that is connected to any alternating current side relay through one first rectifier diode is different from one phase of positive input end of the DC/DC conversion unit that is connected to each alternating current side relay in the three alternating current side relays other than the any alternating current side relay. The other end of each of the three alternating current side relays is further connected to a cathode of one second rectifier diode, and an anode of the one second rectifier diode is connected to one phase of negative input end in the three phases of negative input ends of the DC/DC conversion unit. One second rectifier diode connected to any alternating current side relay is different from one second rectifier diode connected to each alternating current side relay in the three alternating current side relays other than the any alternating current side relay. One phase of negative input end of the DC/DC conversion unit that is connected to any alternating current side relay through one second rectifier diode is different from one phase of negative input end of the DC/DC conversion unit that is connected to each alternating current side relay in the three alternating current side relays other than the any alternating current side relay. Each phase of input end in the three phases of positive input ends and the three phases of negative input ends of the DC/DC conversion unit is connected to the direct current input end of the rectifier through one direct current side relay, and a positive output end, a negative output end, and a neutral wire output end of the DC/DC conversion unit each are connected to the output end of the rectifier. The positive bus capacitor is connected between the positive output end and the neutral wire output end of the DC/DC conversion unit, and the negative bus capacitor is connected between the neutral wire output end and the negative output end of the DC/DC conversion unit. The charging circuit is configured to control the direct current power supply to charge the positive bus capacitor and the negative bus capacitor. The controller is configured to: when a voltage of the three phases of alternating current input ends is abnormal, control the charging circuit to operate and the DC/DC conversion unit to stop operation, and control the three alternating current side relays to turn off; after controlling the three alternating current side relays to turn off for first preset duration, control the six direct current side relays to turn on; and after controlling the six direct current side relays to turn on for second preset duration, control the DC/DC conversion unit to resume operation, and control the charging circuit to stop operation. The rectifier controls the original charging circuit to perform reverse charging on the positive bus capacitor and the negative bus capacitor, so that an output voltage of the rectifier is not decreased by a load in a process in which the rectifier switches between a mains mode and a battery mode, and stability of the rectifier during power supply is improved. Compared with a manner in which a quantity of bus capacitors is increased to avoid a drop of the output voltage of the rectifier, a manner, provided in the embodiments, in which the charging circuit performs reverse charging to avoid a drop of the output voltage of the rectifier can further reduce circuit costs and a volume of the rectifier.

With reference to the fourth aspect, in a first possible implementation, the controller is configured to: after controlling the DC/DC conversion unit to stop operation, when an input current of the DC/DC conversion unit is less than or equal to a preset current threshold, control the three alternating current side relays to turn off. In this way, it is ensured that the three alternating current side relays operate when a current value flowing into the three alternating current side relays does not generate an electric arc, so that safety of the relays during operation is improved and service lives of the relays are prolonged.

With reference to the fourth aspect or the first possible implementation of the fourth aspect, in a second possible implementation, the controller is configured to: when the voltage of the three phases of alternating current input ends recovers, control the charging circuit to operate and the DC/DC conversion unit to stop operation, and control the six direct current side relays to turn off; after controlling the six direct current side relays to turn off for third preset duration, control the three alternating current side relays to turn on; and after controlling the three alternating current side relays to turn on for fourth preset duration, control the DC/DC conversion unit to resume operation, and control the charging circuit to stop operation. It may be understood that, in a time period after the rectifier detects that the alternating-current-power-grid voltage recovers and before the rectifier restores to the mains mode, the rectifier controls the charging circuit to operate, so that the direct current power supply charges the positive bus capacitor and the negative bus capacitor, to avoid a case in which the output voltage of the rectifier is decreased by the load due to absence of energy input in the foregoing process in which the rectifier switches between the two modes, and to further improve stability of the rectifier during operation.

With reference to the second possible implementation of the fourth aspect, in a third possible implementation, the controller is configured to: after controlling the DC/DC conversion unit to stop operation, when the input current of the DC/DC conversion unit is less than or equal to the preset current threshold, control the six direct current side relays to turn off. In this way, it is ensured that the six direct current side relays operate when a current value flowing into the six direct current side relays does not generate an electric arc, so that safety of the relays during operation is improved and service lives of the relays are prolonged.

With reference to any one of the fourth aspect to the third possible implementation of the fourth aspect, in a fourth possible implementation, input ends of the charging circuit are connected to the direct current input ends of the rectifier, and output ends of the charging circuit are respectively connected to the positive output end and the negative output end of the DC/DC conversion unit. The charging circuit includes a first inductor, a second inductor, a first switching transistor, a second switching transistor, a third switching transistor, and a first capacitor. The input end of the charging circuit includes a positive input end and a negative input end. The output ends of the charging circuit include a positive output end and a negative output end. The direct current input ends of the rectifier include a positive direct current input end and a negative direct current input end. The positive input end and the negative input end of the charging circuit are respectively connected to the positive direct current input end and the negative direct current input end of the rectifier. The first switching transistor, the second switching transistor, and the third switching transistor are sequentially connected in series between the positive output end and the negative output end of the charging circuit. One end of the first inductor is connected to the positive input end of the charging circuit, and the other end of the first inductor is connected to a position at which the first switching transistor and the second switching transistor are connected in series. One end of the second inductor is connected to the negative input end of the charging circuit, and the other end of the second inductor is connected to a position at which the second switching transistor and the third switching transistor are connected in series. The first capacitor is connected between the positive input end and the negative input end of the charging circuit. It may be understood that the charging circuit provided in this implementation is applicable to a circuit structure in which a quantity of direct current input ends of the rectifier is 2.

With reference to the fourth possible implementation of the fourth aspect, in a fifth possible implementation, the controller is configured to: in each operation period of the charging circuit, after controlling the second switching transistor to turn on for fifth preset duration, control the second switching transistor to turn off for sixth preset duration, to control the charging circuit to operate, where the fifth preset duration and the sixth preset duration form one operation period of the charging circuit. It may be understood that the rectifier may control the charging circuit by controlling an operation state of a controllable switching transistor in the charging circuit. A control manner is simple and easy to operate.

With reference to any one of the fourth aspect to the third possible implementation of the fourth aspect, in a sixth possible implementation, the charging circuit includes a first inductor, a second inductor, a first switching transistor, a second switching transistor, a third switching transistor, a fourth switching transistor, a first capacitor, and a second capacitor. The input ends of the charging circuit include a positive input end, a negative input end, and a neutral wire input end. The output ends of the charging circuit include a positive output end and a negative output end. The direct current input ends of the rectifier include a positive direct current input end, a negative direct current input end, and a neutral wire direct current input end. The positive input end, the negative input end, and the neutral wire input end of the charging circuit are respectively connected to the positive direct current input end, the negative direct current input end, and the neutral wire direct current input end of the rectifier. The first switching transistor, the second switching transistor, the third switching transistor, and the fourth switching transistor are sequentially connected in series between the positive output end and the negative output end of the charging circuit. One end of the first inductor is connected to the positive input end of the charging circuit, and the other end of the first inductor is connected to a position at which the first switching transistor and the second switching transistor are connected in series. One end of the second inductor is connected to the negative input end of the charging circuit, and the other end of the second inductor is connected to a position at which the third switching transistor and the fourth switching transistor are connected in series. The first capacitor is connected between the positive input end and the neutral wire input end of the charging circuit, and the second capacitor is connected between the neutral wire input end and the negative input end of the charging circuit. The neutral wire input end of the charging circuit is connected to a position at which the second switching transistor and the third switching transistor are connected in series, and to the neutral wire output end of the DC/DC conversion unit. It may be understood that the charging circuit provided in this implementation is applicable to a circuit structure in which a quantity of direct current input ends of the rectifier is 3. The variety of structures of the charging circuit contributes to the variety of structures of the rectifier and high flexibility.

With reference to the sixth possible implementation of the fourth aspect, in a seventh possible implementation, the controller is configured to: in each operation period of the charging circuit, control the second switching transistor to turn on for fifth preset duration and then to turn off for sixth preset duration, and control the third switching transistor to turn on for seventh preset duration and then to turn off for eighth preset duration, to control the charging circuit to operate. One operation period of the charging circuit includes the fifth preset duration and the sixth preset duration, or includes the seventh preset duration and the eighth preset duration. It may be understood that the rectifier may control the charging circuit by controlling an operation state of a controllable switching transistor in the charging circuit. A control manner is simple and easy to operate.

With reference to any one of the fourth aspect to the seventh possible implementation of the fourth aspect, in an eighth possible implementation, the DC/DC conversion unit includes three first DC/DC circuits and three second DC/DC circuits. An output end of the DC/DC conversion unit includes a positive output end, a negative output end, and a neutral wire output end. Three input ends of the three first DC/DC circuits are respectively connected to the three phases of positive input ends of the DC/DC conversion unit, and three input ends of the three second DC/DC circuits are respectively connected to the three phases of negative input ends of the DC/DC conversion unit. A positive output end and a negative output end of the first DC/DC circuit are respectively connected to the positive output end and the neutral wire output end of the DC/DC conversion unit, and a positive output end and a negative output end of the second DC/DC circuit are respectively connected to the neutral wire output end and the negative output end of the DC/DC conversion unit.

With reference to the eighth possible implementation of the fourth aspect, in a ninth possible implementation, the first DC/DC circuit includes a third inductor, a fifth switching transistor, and a first diode, and the second DC/DC circuit includes a fourth inductor, a sixth switching transistor, and a second diode. A first end of the fifth switching transistor is connected to one end of the third inductor and an anode of the first diode. The other end of the third inductor and a cathode of the first diode are respectively connected to the input end and the positive output end of the first DC/DC circuit. A second end of the fifth switching transistor is connected to the negative output end of the first DC/DC circuit. A first end of the sixth switching transistor is connected to the positive output end of the second DC/DC circuit. A second end of the sixth switching transistor is connected to one end of the fourth inductor and a cathode of the second diode. The other end of the fourth inductor and an anode of the second diode are respectively connected to the input end and the negative output end of the second DC/DC circuit.

It should be understood that, for implementations and beneficial effects of the foregoing aspects of the embodiments, reference may be made to each other.

DETAILED DESCRIPTION OF EMBODIMENTS

A UPS provided in the embodiments is applicable to a plurality of application fields such as a new energy smart microgrid field, a power transmission and distribution field, a new energy field, and a photovoltaic energy storage power generation field. The UPS provided in the embodiments is applicable to different application scenarios, for example, a UPS power supply scenario and a photovoltaic energy storage power supply scenario (including a large-scale photovoltaic energy storage power station scenario, small and medium-sized distributed photovoltaic power station scenario, and a residential photovoltaic energy storage power generation system scenario). The following uses the UPS power supply scenario as an example for description.

Figure 1:
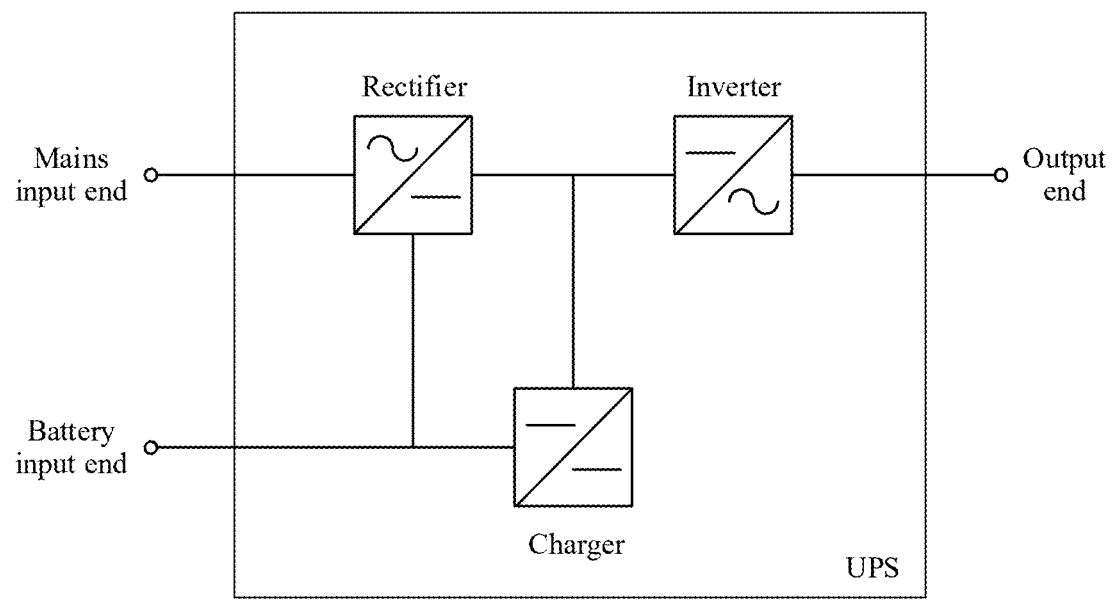
FIG. 1 is a schematic diagram of a structure of a UPS according to a conventional technology.
Figure 2:
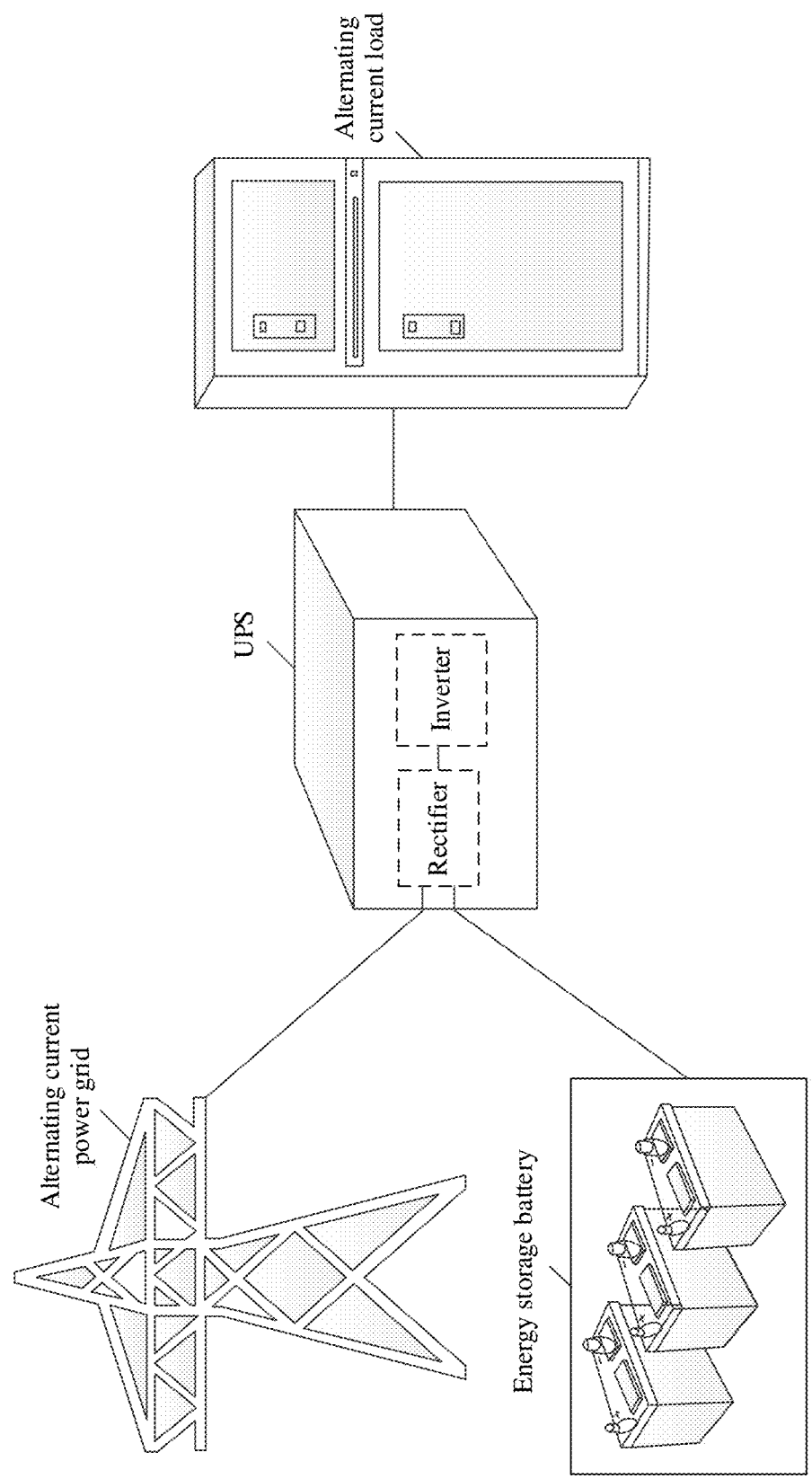
FIG. 2 is a schematic diagram of an application scenario of a UPS according to the embodiments.

FIG. 2 is a schematic diagram of an application scenario of a UPS according to the embodiments. In a UPS power supply scenario, the UPS provided in may be a UPS shown in FIG. 2. The UPS includes alternating current input ends, direct current input ends, a rectifier, an inverter, and an alternating current output end. The alternating current input ends and the direct current input ends of the UPS are respectively connected to an alternating current power grid and an energy storage battery. The alternating current output end of the UPS is connected to an alternating current load. Three phases of alternating current input ends of the rectifier are connected to the alternating current input ends of the UPS. Direct current input ends of the rectifier is connected to the direct current input ends of the UPS. An output end of the rectifier is connected to an input end of the inverter. An output end of the inverter is connected to the alternating current output end of the UPS. The rectifier includes six first rectifier diodes, six second rectifier diodes, three alternating current side relays, six direct current side relays, a DC/DC conversion unit, and a controller. Each of the three phases of alternating current input ends is connected to one end of one of the three alternating current side relays. The other end of each of the three alternating current side relays is connected to anodes of two first rectifier diodes, and cathodes of the two first rectifier diodes are respectively connected to two phases of positive input ends in three phases of positive input ends of the DC/DC conversion unit. Two first rectifier diodes connected to any alternating current side relay in the three alternating current side relays are different from two first rectifier diodes connected to each alternating current side relay in the three alternating current side relays other than the any alternating current side relay. Two phases of positive input ends of the DC/DC conversion unit that are connected to any alternating current side relay through two first rectifier diodes are different from two phases of positive input ends of the DC/DC conversion unit that are connected, through two first rectifier diodes, to each alternating current side relay in the three alternating current side relays other than the any alternating current side relay. The other end of each of the three alternating current side relays is further connected to cathodes of two second rectifier diodes, and anodes of the two second rectifier diodes are respectively connected to two phases of negative input ends in three phases of negative input ends of the DC/DC conversion unit. Two second rectifier diodes connected to any alternating current side relay are different from two second rectifier diodes connected to each alternating current side relay in the three alternating current side relays other than the any alternating current side relay. Two phases of negative input ends of the DC/DC conversion unit that are connected to any alternating current side relay through two second rectifier diodes are different from two phases of negative input ends of the DC/DC conversion unit that are connected, through two second rectifier diodes, to each alternating current side relay in the three alternating current side relays other than the any alternating current side relay. Each phase of input end in the three phases of positive input ends and the three phases of negative input ends of the DC/DC conversion unit is connected to the direct current input end of the rectifier through one direct current side relay, and an output end of the DC/DC conversion unit is connected to the output end of the rectifier.

After the UPS starts operation, the three alternating current side relays are in a turn-on state, and the UPS is in a mains mode. For example, the UPS converts, through the rectifier, an alternating current input from the alternating current power grid into a direct current and outputs the direct current to the inverter. The inverter converts the direct current into an alternating current and outputs the alternating current to the output end of the UPS, thereby supplying power to the alternating current load (for example, an alternating current household device). Then, when a voltage of the three phases of alternating current input ends of the rectifier is abnormal, the controller of the UPS controls the DC/DC conversion unit to stop operation, and controls the three alternating current side relays to turn off; after controlling the three alternating current side relays to turn off for first preset duration, controls the six direct current side relays to turn on; and after controlling the six direct current side relays to turn on for second preset duration, controls the DC/DC conversion unit to resume operation, so that the UPS switches from the mains mode to a battery mode.

It may be understood that, each phase of alternating current input end of the rectifier in the UPS provided in the embodiments is connected to two phases of input ends of the DC/DC conversion unit through two rectifier diodes respectively, to implement interleaved parallel connection. This reduces an input current peak of the DC/DC conversion unit, reduces circuit costs of circuit elements in the DC/DC conversion unit, and reduces sizes of an input filter and an output filter of the rectifier, so that circuit costs of the UPS are reduced. In addition, the UPS uses a structure of a relay and a rectifier diode as a mode switching circuit. The mode switching circuit does not need an additional drive circuit, and a loss of the relay and the rectifier diode is relatively small. Therefore, circuit costs of the UPS can be further effectively reduced. The foregoing is merely an example of the application scenario of the UPS provided in the embodiments rather than exhaustive examples. The application scenario is not limited.

With reference to FIG. 3 to FIG. 11, an operating principle of a UPS provided in the embodiments is described below by using examples.

Figure 3:
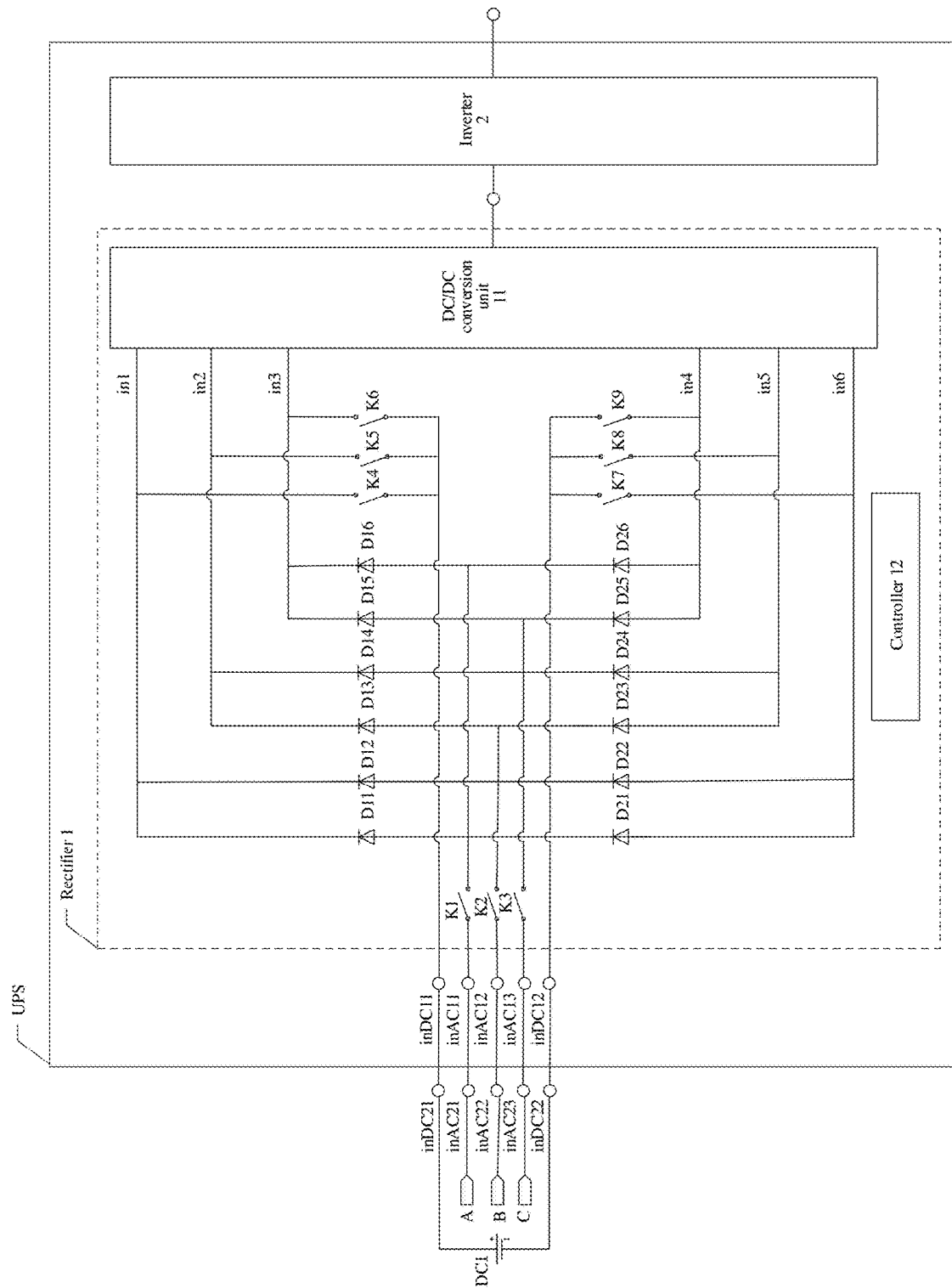
FIG. 3 is a schematic diagram of a structure of a UPS according to the embodiments.

FIG. 3 is a schematic diagram of a structure of a UPS according to the embodiments.

As shown in FIG. 3, the UPS includes alternating current input ends (corresponding to alternating current input ends inAC21, inAC22, and inAC23 shown in FIG. 3), direct current input ends (corresponding to direct current input ends inDC21 and inDC22 shown in FIG. 3), a rectifier 1, an inverter 2, and an alternating current output end. The alternating current input ends inAC21, inAC22, and inAC23 of the UPS are respectively connected to a phase A, a phase B, and a phase C of the alternating current power grid. The direct current input ends inDC21 and inDC22 of the UPS are connected to a direct current power supply DC1. In some embodiments, the direct current input ends inDC21 and inDC22 of the UPS are respectively connected to a positive pole and a negative pole of the direct current power supply DC1. The alternating current input ends inAC21, inAC22, and inAC23 of the UPS are respectively connected to three phases of alternating current input ends inAC11, inAC12, and inAC13 of the rectifier 1. The direct current input ends inDC21 and inDC22 of the UPS are respectively connected to direct current input ends inDC11 and inDC12 of the rectifier 1. An output end of the rectifier 1 is connected to an input end of the inverter 2. An output end of the inverter 2 is connected to the alternating current output end of the UPS. The rectifier 1 includes six first rectifier diodes (corresponding to first rectifier diodes D11, D12, D13, D14, D15, and D16 shown in FIG. 3), six second rectifier diodes (corresponding to second rectifier diodes D21, D22, D23, D24, D25, and D26 shown in FIG. 3), three alternating current side relays (corresponding to alternating current side relays K1, K2, and K3 shown in FIG. 3), six direct current side relays (corresponding to direct current side relays K4, K5, K6, K7, K8, and K9 shown in FIG. 3), a DC/DC conversion unit 11, and a controller 12.

Each of the three phases of alternating current input ends is connected to one end of one of the three alternating current side relays, and the three phases of alternating current input ends are in a one-to-one correspondence with the three alternating current side relays. The other end of each of the three alternating current side relays is connected to anodes of two first rectifier diodes, and cathodes of the two first rectifier diodes are respectively connected to two phases of positive input ends in three phases of positive input ends of the DC/DC conversion unit 11. Two first rectifier diodes connected to any alternating current side relay in the three alternating current side relays are different from two first rectifier diodes connected to each alternating current side relay in the three alternating current side relays other than the any alternating current side relay. Two phases of positive input ends of the DC/DC conversion unit 11 that are connected to any alternating current side relay through two first rectifier diodes are different from two phases of positive input ends of the DC/DC conversion unit that are connected, through two first rectifier diodes, to each alternating current side relay in the three alternating current side relays other than the any alternating current side relay. For example, the one phase of alternating current input end inAC11 of the rectifier 1 is connected to one end of the alternating current side relay K1, the other end of the alternating current side relay K1 is connected to an anode of the first rectifier diode D11 and an anode of the first rectifier diode D16, and a cathode of the first rectifier diode D11 and a cathode of the first rectifier diode D16 are respectively connected to two phases of positive input ends in1 and in3 of the DC/DC conversion unit 11. The one phase of alternating current input end inAC12 of the rectifier 1 is connected to one end of the alternating current side relay K2, the other end of the alternating current side relay K2 is connected to an anode of the first rectifier diode D12 and an anode of the first rectifier diode D13, and a cathode of the first rectifier diode D12 and a cathode of the first rectifier diode D13 are respectively connected to two phases of positive input ends in1 and in2 of the DC/DC conversion unit 11. The one phase of alternating current input end inAC13 of the rectifier 1 is connected to one end of the alternating current side relay K3, the other end of the alternating current side relay K3 is connected to an anode of the first rectifier diode D14 and an anode of the first rectifier diode D15, and a cathode of the first rectifier diode D14 and a cathode of the first rectifier diode D15 are respectively connected to two phases of positive input ends in2 and in3 of the DC/DC conversion unit 11.

The other end of each of the three alternating current side relays is further connected to cathodes of two second rectifier diodes, and anodes of the two second rectifier diodes are respectively connected to two phases of negative input ends in three phases of negative input ends of the DC/DC conversion unit 11. Two second rectifier diodes connected to any alternating current side relay are different from two second rectifier diodes connected to each alternating current side relay in the three alternating current side relays other than the any alternating current side relay. Two phases of negative input ends of the DC/DC conversion unit that are connected to any alternating current side relay through two second rectifier diodes are different from two phases of negative input ends of the DC/DC conversion unit that are connected, through two second rectifier diodes, to each alternating current side relay in the three alternating current side relays other than the any alternating current side relay. For example, the other end of the alternating current side relay K1 is further connected to a cathode of the second rectifier diode D21 and a cathode of the second rectifier diode D26, and an anode of the second rectifier diode D21 and an anode of the second rectifier diode D26 are respectively connected to two phases of negative input ends in6 and in4 of the DC/DC conversion unit 11. The other end of the alternating current side relay K2 is further connected to a cathode of the second rectifier diode D22 and a cathode of the second rectifier diode D23, and an anode of the second rectifier diode D22 and an anode of the second rectifier diode D23 are respectively connected to two phases of negative input ends in6 and in5 of the DC/DC conversion unit 11. The other end of the alternating current side relay K3 is further connected to a cathode of the second rectifier diode D24 and a cathode of the second rectifier diode D25, and an anode of the second rectifier diode D24 and an anode of the second rectifier diode D25 are respectively connected to two phases of negative input ends in5 and in4 of the DC/DC conversion unit 11.

Each phase of input end in the three phases of positive input ends in1, in2, and in3 and the three phases of negative input ends in6, in5, and in4 of the DC/DC conversion unit 11 is connected to the direct current input end of the rectifier 1 through one of the direct current side relays K4, K5, K6, K7, K8, and K9. For example, the three phases of positive input ends in1, in2, and in3 of the DC/DC conversion unit 11 are connected to the direct current input end inDC11 of the rectifier 1 through the direct current side relays K4, K5, and K6 respectively, and the three phases of negative input ends in6, in5, and in4 of the DC/DC conversion unit 11 are connected to the direct current input end inDC12 of the rectifier 1 through the direct current side relays K7, K8, and K9 respectively. An output end of the DC/DC conversion unit 11 is connected to the output end of the rectifier 1.

In an implementation, when a voltage of the three phases of alternating current input ends inAC11, inAC12, and inAC13 is abnormal, the controller 12 controls the DC/DC conversion unit 11 to stop operation, and controls the alternating current side relays K1, K2, and K3 to turn off. After controlling the alternating current side relays K1, K2, and K3 to turn off for first preset duration, the controller 12 controls the six direct current side relays K4 to K9 to turn on. After controlling the six direct current side relays K4 to K9 to turn on for second preset duration, the controller 12 controls the DC/DC conversion unit 11 to resume operation.

In this embodiment, each phase of alternating current input end of the rectifier 1 is connected to two phases of input ends of the DC/DC conversion unit 11 through two rectifier diodes respectively, to implement interleaved parallel connection. This reduces an input current peak of the DC/DC conversion unit 11, reduces circuit costs of circuit elements in the DC/DC conversion unit 11, and reduces sizes of an input filter and an output filter of the rectifier 1, so that circuit costs of the UPS are reduced. In addition, the UPS uses a structure of a relay and a rectifier diode as a mode switching circuit. The mode switching circuit does not need an additional drive circuit, and a loss of the relay and the rectifier diode is relatively small. Therefore, circuit costs of the UPS can be further effectively reduced.

Figure 4:
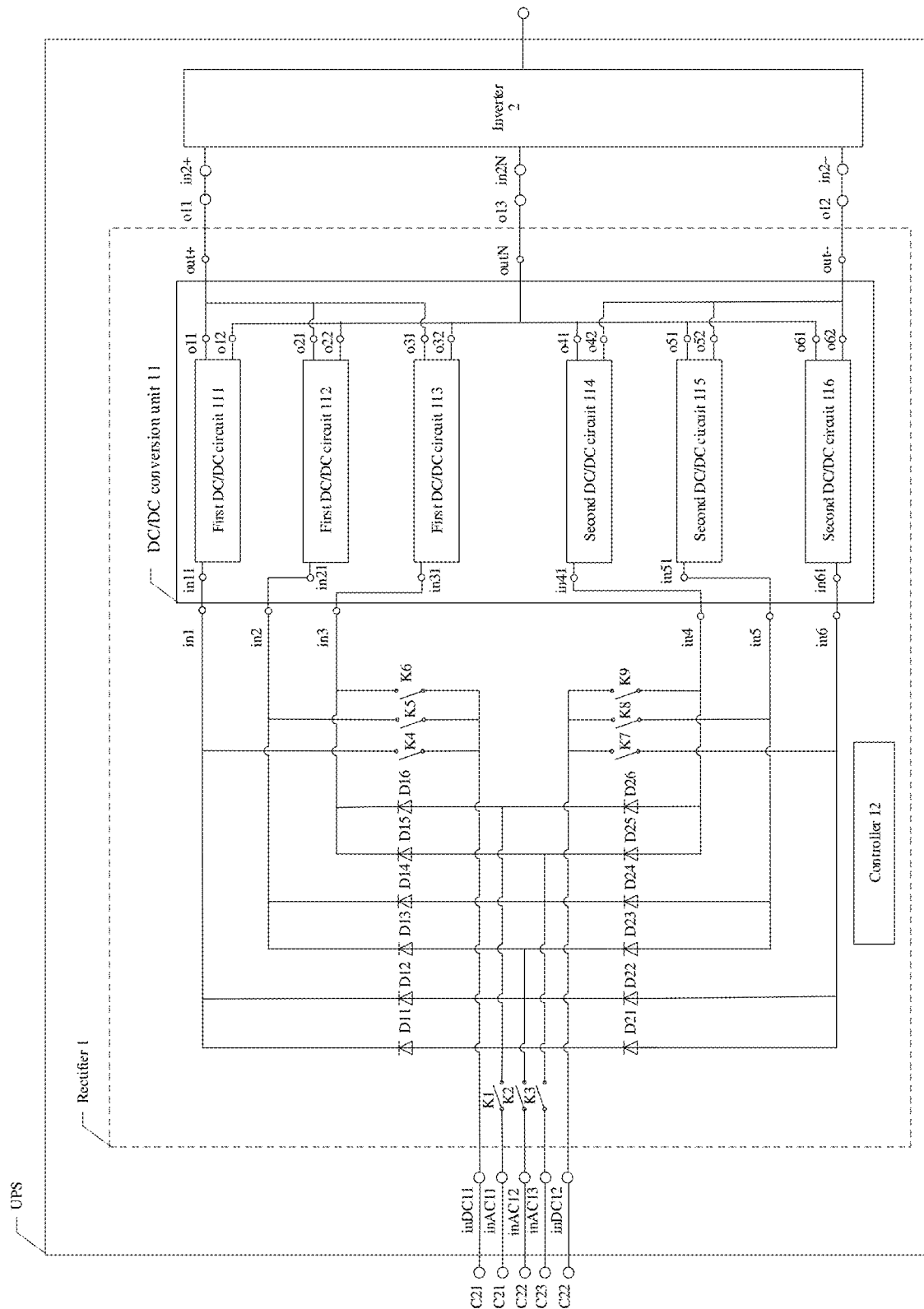
FIG. 4 is a schematic diagram of another structure of a UPS according to the embodiments.

The foregoing DC/DC conversion unit 11 may include six DC/DC circuits. For details, refer to FIG. 4. FIG. 4 is a schematic diagram of another structure of a UPS according to the embodiments. As shown in FIG. 4, the DC/DC conversion unit 11 includes a first DC/DC circuit 111, a first DC/DC circuit 112, a first DC/DC circuit 113, a second DC/DC circuit 114, a second DC/DC circuit 115, and a second DC/DC circuit 116. An output end of the DC/DC conversion unit 11 includes a positive output end out+, a negative output end out−, and a neutral wire output end outN. An input end in11 of the first DC/DC circuit 111, an input end in21 of the first DC/DC circuit 112, and an input end in31 of the first DC/DC circuit 113 are respectively connected to three phases of positive input ends in1, in2, and in3 of the DC/DC conversion unit 11. An input end in41 of the second DC/DC circuit 114, an input end in51 of the second DC/DC circuit 115, and an input end in61 of the second DC/DC circuit 116 are respectively connected to three phases of negative input ends in4, in5, and in6 of the DC/DC conversion unit 11. A positive output end o11 of the first DC/DC circuit 111, a positive output end o21 of the first DC/DC circuit 112, and a positive output end o31 of the first DC/DC circuit 113 are all connected to the positive output end out+ of the DC/DC conversion unit 11. A negative output end o12 of the first DC/DC circuit 111, a negative output end o22 of the first DC/DC circuit 112, a negative output end o32 of the first DC/DC circuit 113, a positive output end o41 of the second DC/DC circuit 114, a positive output end o51 of the second DC/DC circuit 115, and a positive output end o61 of the second DC/DC circuit 116 are all connected to the neutral wire output end outN of the DC/DC conversion unit 11. A negative output end o42 of the second DC/DC circuit 114, a negative output end o52 of the second DC/DC circuit 115, and a negative output end o62 of the second DC/DC circuit 116 are all connected to the negative output end out− of the DC/DC conversion unit 11. An output end of a rectifier 1 includes a positive output end o11, a negative output end o12, and a neutral wire output end o13. The positive output end out+, the negative output end out−, and the neutral wire output end outN of the DC/DC conversion unit 11 are respectively connected to the positive output end o11, the negative output end o12, and the neutral wire output end o13 of the rectifier 1. An input end of an inverter 2 includes a positive input end in2+, a negative input end in2−, and a neutral wire input end in2N. The positive input end in2+, the negative input end in2−, and the neutral wire input end in2N of the inverter 2 are respectively connected to the positive output end o11, the negative output end o12, and the neutral wire output end o13 of the rectifier 1.

The foregoing six DC/DC circuits may be BOOST circuits or other voltage increasing circuits.

Herein, for other components in the UPS other than the DC/DC conversion unit 11 and the inverter 2 and their connection relationships, refer to the descriptions of corresponding parts in the UPS shown in FIG. 3. Details are not described herein again.

In an implementation, the UPS is in a mains mode. When an alternating-current-power-grid voltage of three phases of alternating current input ends inAC11, inAC12, and inAC13 is abnormal, a controller 12 controls the first DC/DC circuit 111, the first DC/DC circuit 112, the first DC/DC circuit 113, the second DC/DC circuit 114, the second DC/DC circuit 115, and the second DC/DC circuit 116 to stop operation, so that the DC/DC conversion unit 11 stops operation, and controls three alternating current side relays K1, K2, and K3 to turn off. After controlling the three alternating current side relays K1, K2, and K3 to turn off for first preset duration, the controller 12 controls six direct current side relays K4 to K9 to turn on. After controlling the six direct current side relays K4 to K9 to turn on for second preset duration, the controller 12 controls the first DC/DC circuit 111, the first DC/DC circuit 112, the first DC/DC circuit 113, the second DC/DC circuit 114, the second DC/DC circuit 115, and the second DC/DC circuit 116 to resume operation, so that the DC/DC conversion unit 11 resumes operation.

For ease of description, the following describes a circuit structure and an operating principle of the rectifier 1 by using an example in which the DC/DC circuit in the DC/DC conversion unit 11 shown in FIG. 4 is a BOOST circuit.

Figure 5:
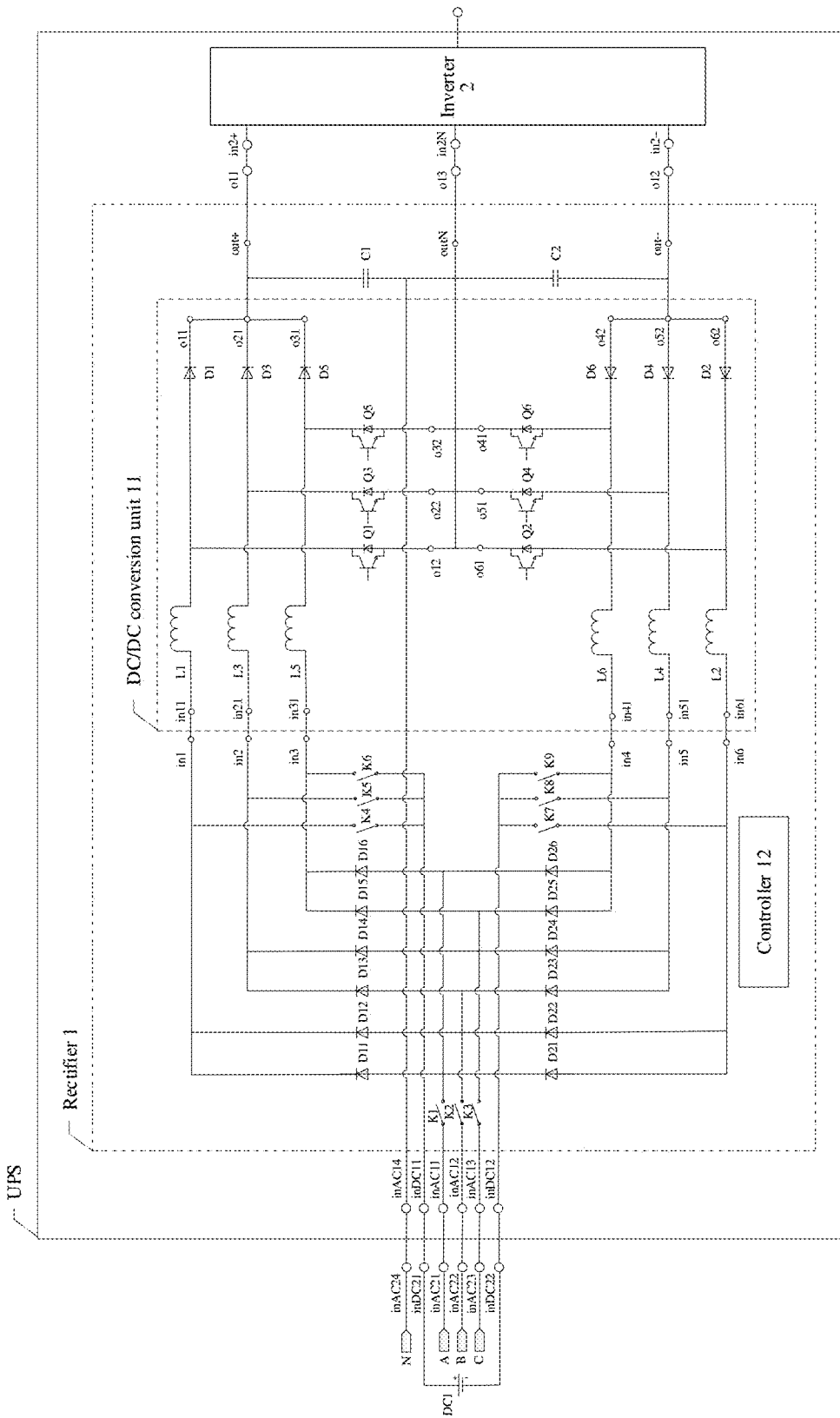
FIG. 5 is a schematic diagram of still another structure of a UPS according to the embodiments.

FIG. 5 is a schematic diagram of another structure of a rectifier according to the embodiments. As shown in FIG. 5, a DC/DC conversion unit 11 includes third inductors L1, L3, and L5, fifth switching transistors Q1, Q3, and Q5, first diodes D1, D3, and D5, fourth inductors L2, L4, and L6, sixth switching transistors Q2, Q4, and Q6, and second diodes D2, D4, and D6. The third inductor L1, the fifth switching transistor Q1, and the first diode D1 form a first DC/DC circuit 111. The third inductor L3, the fifth switching transistor Q3, and the first diode D3 form a first DC/DC circuit 112. The third inductor L5, the fifth switching transistor Q5, and the first diode D5 form a first DC/DC circuit 113. The fourth inductor L2, the sixth switching transistor Q2, and the second diode D2 form a second DC/DC circuit 116. The fourth inductor L4, the sixth switching transistor Q4, and the second diode D4 form a second DC/DC circuit 115. The fourth inductor L6, the sixth switching transistor Q6, and the second diode D6 form a second DC/DC circuit 114.

A collector of the fifth switching transistor Q1 is connected to one end of the third inductor L1 and an anode of the first diode D1. The other end of the third inductor L1 and a cathode of the first diode D1 are respectively connected to an input end in11 and a positive output end o11 of the first DC/DC circuit 111. An emitter of the fifth switching transistor Q1 is connected to a negative output end o12 of the first DC/DC circuit 111.

A collector of the fifth switching transistor Q3 is connected to one end of the third inductor L3 and an anode of the first diode D3. The other end of the third inductor L3 and a cathode of the first diode D3 are respectively connected to an input end in21 and a positive output end o21 of the first DC/DC circuit 112. An emitter of the fifth switching transistor Q3 is connected to a negative output end o22 of the first DC/DC circuit 112.

A collector of the fifth switching transistor Q5 is connected to one end of the third inductor L5 and an anode of the first diode D5. The other end of the third inductor L5 and a cathode of the first diode D5 are respectively connected to an input end in31 and a positive output end o31 of the first DC/DC circuit 113. An emitter of the fifth switching transistor Q5 is connected to a negative output end o32 of the first DC/DC circuit 113.

A collector of the sixth switching transistor Q6 is connected to a positive output end o41 of the second DC/DC circuit 114. A second end, an emitter, of the sixth switching transistor Q6 is connected to one end of the fourth inductor L6 and a cathode of the second diode D6. The other end of the fourth inductor L6 and an anode of the second diode D6 are respectively connected to an input end in41 and a negative output end o42 of the second DC/DC circuit 114.

A collector of the sixth switching transistor Q4 is connected to a positive output end o51 of the second DC/DC circuit 115. A second end, an emitter, of the sixth switching transistor Q4 is connected to one end of the fourth inductor L4 and a cathode of the second diode D4. The other end of the fourth inductor L4 and an anode of the second diode D4 are respectively connected to an input end in51 and a negative output end o52 of the second DC/DC circuit 115.

A collector of the sixth switching transistor Q2 is connected to a positive output end o61 of the second DC/DC circuit 116. A second end, an emitter, of the sixth switching transistor Q2 is connected to one end of the fourth inductor L2 and a cathode of the second diode D2. The other end of the fourth inductor L2 and an anode of the second diode D2 are respectively connected to an input end in61 and a negative output end o62 of the second DC/DC circuit 116.

The rectifier 1 further includes a positive bus capacitor C1 and a negative bus capacitor C2. The positive bus capacitor C1 is connected between the positive output end out+ and the neutral wire output end outN of the DC/DC conversion unit 11, and the negative bus capacitor C2 is connected between the neutral wire output end outN and the negative output end out– of the DC/DC conversion unit 11.

The UPS further includes a neutral wire alternating current input end inAC24. The neutral wire alternating current input end inAC24 is connected to a neutral point N of an alternating current power grid. An input end of the rectifier 1 further includes an alternating current input end inAC14. The alternating current input end inAC14 is connected to the neutral wire alternating current input end inAC24 and the neutral wire output end outN of the DC/DC conversion unit 11.

Herein, for other components in the UPS other than the DC/DC conversion unit 11 and their connection relationships, refer to the descriptions of corresponding parts in the UPS shown in FIG. 4. Details are not described herein again.

In an implementation, the UPS is in a mains mode. When an alternating-current-power-grid voltage of three phases of alternating current input ends inAC11, inAC12, and inAC13 is abnormal, a controller 12 controls controllable switching transistors in the six DC/DC circuits in the DC/DC conversion unit 11 to turn off, so that the DC/DC conversion unit 11 stops operation, and controls alternating current side relays K1, K2, and K3 to turn off. After controlling the alternating current side relays K1, K2, and K3 to turn off for first preset duration, the controller 12 controls six direct current side relays K4 to K9 to turn on. After controlling the six direct current side relays K4 to K9 to turn on for second preset duration, the controller 12 controls controllable switching transistors in the foregoing six DC/DC circuits to turn on, so that the DC/DC conversion unit 11 resumes operation.

The first preset duration is longer than or equal to duration required for the alternating current side relay to switch from a turn-on state to a turn-off state, and the second preset duration is longer than or equal to duration required for the direct current side relay to switch from a turn-off state to a turn-on state.

For example, when the UPS is in the mains mode, the three alternating current side relays K1 to K3 are all in a turn-on state, and controllable switching transistors in all the DC/DC circuits in the DC/DC conversion unit 11 are all in a turn-on state at a preset duty cycle. The controller 12 monitors the alternating-current-power-grid voltage of the three phases of alternating current input ends inAC11, inAC12, and inAC13 in real time. When detecting that the alternating-current-power-grid voltage is not within a preset voltage range, which indicates that the alternating-current-power-grid voltage is abnormal, the controller 12 controls the three fifth switching transistors Q1, Q3, and Q5 and the three sixth switching transistors Q6, Q4, and Q2 to turn off, so that the three first DC/DC circuits 111, 112, and 113, the three second DC/DC circuits 114, 115, and 116 all stop operation, that is, the DC/DC conversion unit 11 stops operation. Then, after controlling the DC/DC conversion unit 11 to stop operation, the controller 12 controls the three alternating current side relays K1, K2, and K3 to be all turned off. After controlling the three alternating current side relays K1, K2, and K3 to turn off for the first preset duration, the controller 12 controls the six direct current side relays K4 to K9 to turn on, so that an input energy source of the UPS is switched from the alternating current power grid to a direct current power supply. After the six direct current side relays K4 to K9 are controlled to turn on for the second preset duration, it indicates that the six direct current side relays are reliably turned on. In this case, the controller 12 controls the three fifth switching transistors Q1, Q3, and Q5 and the three sixth switching transistors Q6, Q4, and Q2 to turn on at a preset duty cycle, so that the three first DC/DC circuits 111, 112, and 113 and the three second DC/DC circuits 114, 115, and 116 all resume operation, that is, the DC/DC conversion unit 11 resumes operation, and the UPS is in a battery mode. In the battery mode, the three first DC/DC circuits increase a voltage of a direct current input by the direct current power supply, and then charge the positive bus capacitor C1. The three second DC/DC circuits increase a voltage of a direct current input by the direct current power supply, and then supply power to the negative bus capacitor C2. Therefore, the UPS continues to output a direct current through the direct current power supply connected to direct current input ends of the UPS.

Further, because a current direction of an inductor cannot change abruptly, even after the controllable switching transistor in the DC/DC circuit is controlled to turn off, energy stored in the inductor is released through the diode in the DC/DC circuit, and a current (such as the inductor current) flowing through the three alternating current side relays is not 0. If the relay is controlled to operate when the inductor current is relatively large, the inductor current generates an electric arc at the relay, and consequently the relay is damaged, and even the rectifier 1 is damaged. Based on this, after the controller 12 controls, based on the abnormal alternating-current-power-grid voltage, the DC/DC conversion unit 11 to stop operation, when an input current of each DC/DC circuit is less than or equal to a preset current threshold, that is, when inductor currents in the three third inductors L1, L3, and L5 and the three fourth inductors L2, L4, and L6 are all less than or equal to the preset current threshold, the controller 12 may control the three alternating current side relays K1, K2, and K3 to be all turned off. The preset current threshold may be 0. In this way, it is ensured that the relays operate when a current value flowing into the relays does not generate an electric arc, so that safety of the relays during operation is improved and service lives of the relays are prolonged.

Then, when detecting that the alternating-current-power-grid voltage of the three phases of alternating current input ends inAC11, inAC12, and inAC13 recovers, the controller 12 controls controllable switching transistors in the six DC/DC circuits in the DC/DC conversion unit 11 to turn off, so that the DC/DC conversion unit 11 stops operation, and controls the six direct current side relays K4 to K9 to turn off. After controlling the six direct current side relays K4 to K9 to turn off for third preset duration, the controller 12 controls the three alternating current side relays K1 to K3 to turn on. After controlling the three alternating current side relays K1 to K3 to turn on for fourth preset duration, the controller 12 controls the controllable switching transistors in the foregoing six DC/DC circuits to turn on, so that the DC/DC conversion unit 11 resumes operation.

In some embodiments, after the UPS is in the battery mode, that is, after the DC/DC conversion unit 11 resumes operation, when detecting that the alternating-current-power-grid voltage of the three phases of alternating current input ends inAC11, inAC12, and inAC13 is within the preset voltage range, which indicates that the alternating-current-power-grid voltage recovers, the controller 12 controls the DC/DC conversion unit 11 to stop operation, and controls the six direct current side relays K4 to K9 to turn off. After controlling the six direct current side relays K4 to K9 to turn off for the third preset duration, the controller 12 controls the three alternating current side relays K1 to K3 to be all turned on, so that an input energy source of the rectifier 1 is switched from the direct current power supply to the alternating current power grid. After the three alternating current side relays K1 to K3 are controlled to turn on for the fourth preset duration, it indicates that the three alternating current side relays are reliably turned on. In this case, the controller 12 controls the DC/DC conversion unit 11 to resume operation, so that the rectifier 1 is in the mains mode. In the mains mode, the three first DC/DC circuits increase a voltage of a direct current of the alternating-current-power-grid voltage rectified by three first rectifier diodes, and then charge the positive bus capacitor C1. The three second DC/DC circuits increase a voltage of a direct current of the alternating-current-power-grid voltage rectified by three second rectifier diodes, and then supply power to the negative bus capacitor C2. Therefore, the rectifier 1 outputs a direct current through the alternating current power grid connected to the alternating current input ends of the rectifier 11. Herein, for a specific implementation in which the controller 12 controls the DC/DC conversion unit 11 to stop operation and resume operation, refer to the descriptions of corresponding parts in the foregoing embodiment. Details are not described herein again. It should be noted that duration consumed for switching a relay from turn-off to reliable turn-on may be the same as or different from duration consumed for switching the same relay from turn-on to reliable turn-off. This is not limited. For example, the third preset duration may be the same as or different from the second preset duration.

Further, because a current direction of an inductor cannot change abruptly, even after the controllable switching transistor in the DC/DC circuit is controlled to turn off, energy stored in the inductor is released through the diode in the DC/DC circuit, and a current (such as the inductor current) flowing through the six direct current side relays is not 0. If the relay is controlled to operate when the inductor current is relatively large, the inductor current generates an electric arc at the relay, and consequently the relay is damaged, and even the rectifier 1 is damaged. Based on this, after the controller 12 controls, when the alternating-current-power-grid voltage recovers, the DC/DC conversion unit 11 to stop operation, when an input current of each DC/DC circuit is less than or equal to the preset current threshold, that is, when inductor currents in the three third inductors L1, L3, and L5 and the three fourth inductors L2, L4, and L6 are all less than or equal to the preset current threshold, the controller 12 may control the six direct current side relays K4 to K9 to be all turned off. The preset current threshold may be 0. In this way, it is ensured that the six direct current side relays operate when a current value flowing into the six direct current side relays does not generate an electric arc, so that safety of the relays during operation is improved and service lives of the relays are prolonged.

Figure 6:
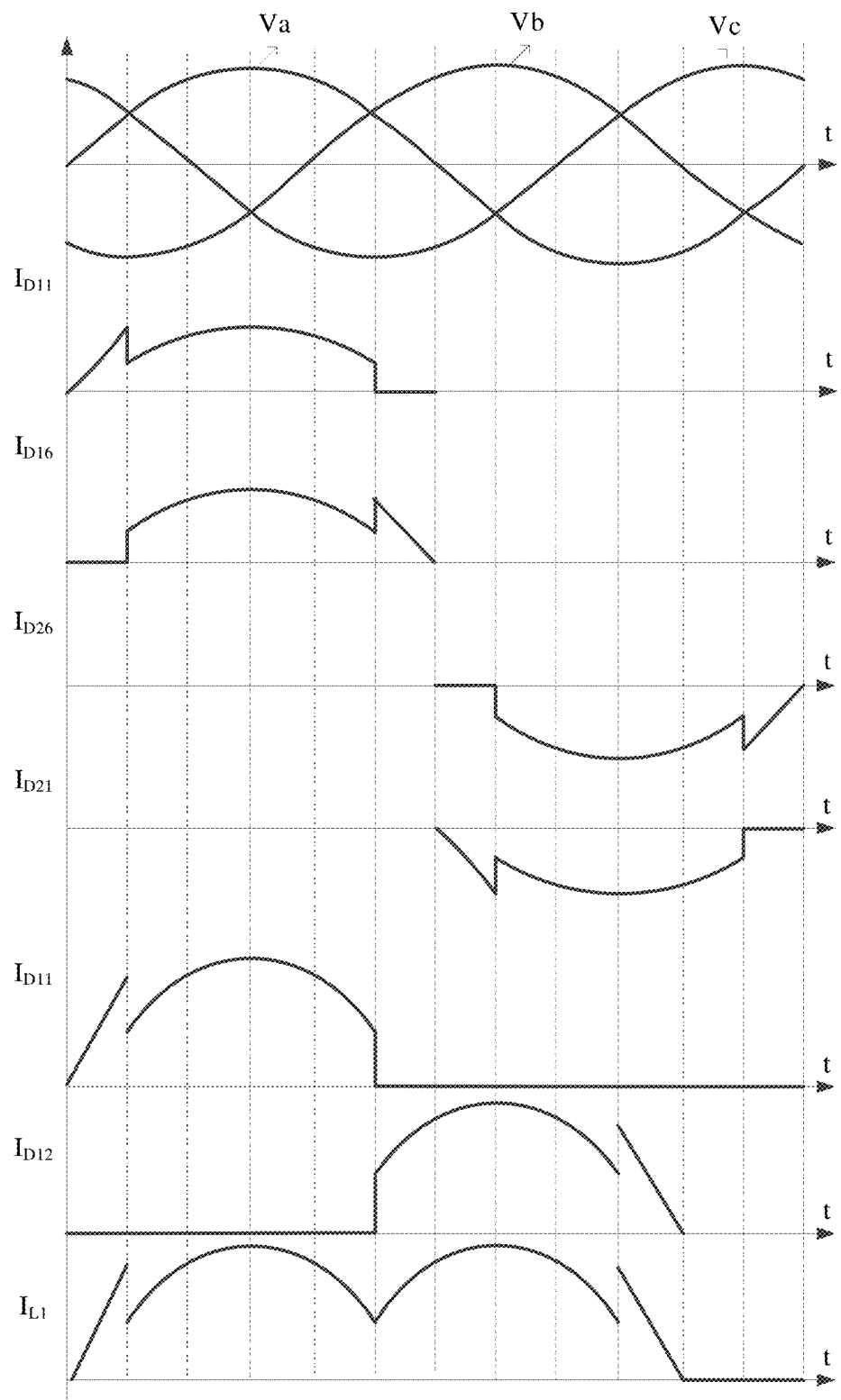
FIG. 6 is a schematic diagram of an operating waveform of a rectifier according to the embodiments.

In addition, for ease of understanding, refer to a schematic diagram of an operating waveform of the rectifier 1 shown in FIG. 6. As shown in FIG. 6, in a 360-degree three-phase alternating current voltage power frequency period, each DC/DC circuit in the DC/DC conversion unit 11 is turned on for 300 degrees, and an operation interval of interleaved and parallel connection of each DC/DC circuit is 240 degrees. A positive half wave of a phase-A input voltage Va of one phase of alternating current input end inAC11 of the rectifier 1 is used as an example: It can be understood from a current waveform of a current $I_{D11}$ of a first rectifier diode D11 and a current waveform of a current $I_{D16}$ of a first rectifier diode D16 in FIG. 6 that, interleaved and parallel connection of the positive half wave of the phase-A input voltage Va is implemented by connecting the first rectifier diode D11, the first DC/DC circuit 111, the first rectifier diode D16, and the first DC/DC circuit 113 in parallel. A turn-on interval of the first rectifier diode D11 is 0-150 degrees (because the input voltage Va>Vb, and Va>0 in this interval). A turn-on interval of the first rectifier diode D16 is 30-180 degrees (because the input voltage Va>Vc, and Va>0 in this interval). Therefore, in the interval of 30-150 degrees, the first rectifier diode D11 and the first DC/DC circuit 111 may operate in parallel with the first rectifier diode D16 and the first DC/DC circuit 113. In addition, Q1 and L1, and Q5 and L5 have the same switching frequency but can operate with a 180-degree phase difference. In this way, the first DC/DC circuit 111 and the first DC/DC circuit 113 can be connected in an interleaved and parallel manner in the interval of 30-150 degrees.

The operation interval of each DC/DC circuit may be extended to 300 degrees, which improves utilization of the inductor. In addition, more importantly, in each power frequency half-wave period (180 degrees), each phase of alternating current (that is, an input voltage of each phase of alternating current input end of the rectifier 1) input by the alternating current power grid may be implemented by operation of two DC/DC circuits in interleaved and parallel connection in an interval of 120 degrees. This interleaved and parallel connection occurs near a peak value of each phase of alternating-current voltage input by the alternating current power grid, and power that needs to be transmitted to a load in this interval is the largest. Therefore, operation in interleaved and parallel connection can reduce a rated current of an inductor, a power switching transistor, and a power diode in the DC/DC circuit, and reduce an input current peak of the DC/DC circuit. This reduces a quantity of input filter capacitors and a quantity of output filter capacitors in the rectifier 1. In addition, the rectifier diode has a lower price than the inductor, the power switching transistor, and the power diode in the DC/DC circuit. Therefore, compared with a rectifier in which an input end of each DC/DC circuit is connected to one alternating current input end of the rectifier by using one rectifier diode, in the rectifier 1 provided in the embodiments, an input end of each DC/DC circuit is connected to two phases of alternating current input ends of the rectifier 1 by using two rectifier diodes respectively, so that circuit costs are effectively reduced. In addition, when an electromagnetic compatibility (EMC) filter is further disposed at the input end of the rectifier 1, because a ripple of an input current is reduced, a design of the EMC filter may be simplified, thereby improving performance of the EMC filter. In addition, because a ripple of an output current of the rectifier 1 is reduced, heat generated by the foregoing two bus capacitors may be reduced, so that service lives of the bus capacitors (that is, electrolytic capacitors) are prolonged, or a quantity of bus capacitors may be reduced.

In this embodiment, the input end of each DC/DC circuit in the DC/DC conversion unit 11 uses a circuit structure in which two phases of alternating current input ends of the rectifier 1 are connected by using two rectifier diodes respectively, so that each phase of alternating current of the alternating current power grid, after being rectified by the rectifier diode, can be output by using two DC/DC circuits that operate in interleaved and parallel connection. Therefore, a rated current of the inductor, the power switching transistor, and the power diode in the DC/DC circuit is reduced, and circuit costs of the rectifier 1 are reduced, to reduce circuit costs of the UPS. In addition, the UPS uses a structure of a relay and a rectifier diode as a mode switching circuit. The mode switching circuit does not need an additional drive circuit, and a loss of the relay and the rectifier diode is relatively small. Therefore, circuit costs of the UPS can be further effectively reduced.

Because it may take 10 ms to 20 ms to turn off or turn on the relay, in a process in which the UPS switches between the mains mode and the battery mode, neither the alternating current power grid nor the direct current power supply can supply power to the positive bus capacitor C1 and the negative bus capacitor C2. In this period of time, a load connected to an output end of the rectifier 1 continuously consumes energy of the positive bus capacitor C1 and the negative bus capacitor C2. Consequently, the rectifier 11 shuts down due to an excessively low output voltage, and the load is powered off. As a result, the UPS cannot operate properly. To resolve this problem, currently, a quantity of bus capacitors is increased to prevent the output voltage of the rectifier 1 from being decreased by the load in a process in which the rectifier 1 switches between the foregoing two modes, to improve stability of the rectifier 1 during power supply and improve stability of the UPS during power supply. However, this manner causes an increase in circuit costs and volume of the UPS.

Based on this, the embodiments provide a UPS. The UPS may control a charging circuit inside the UPS to implement reverse charging on a positive bus capacitor C1 and a negative bus capacitor C2 by a direct current power supply, so that an output voltage of a rectifier 1 is not decreased by a load in a process in which the rectifier 1 switches between the foregoing two modes. This is to improve stability of the rectifier 1 during power supply and improve stability of the UPS during power supply.

Figure 7:
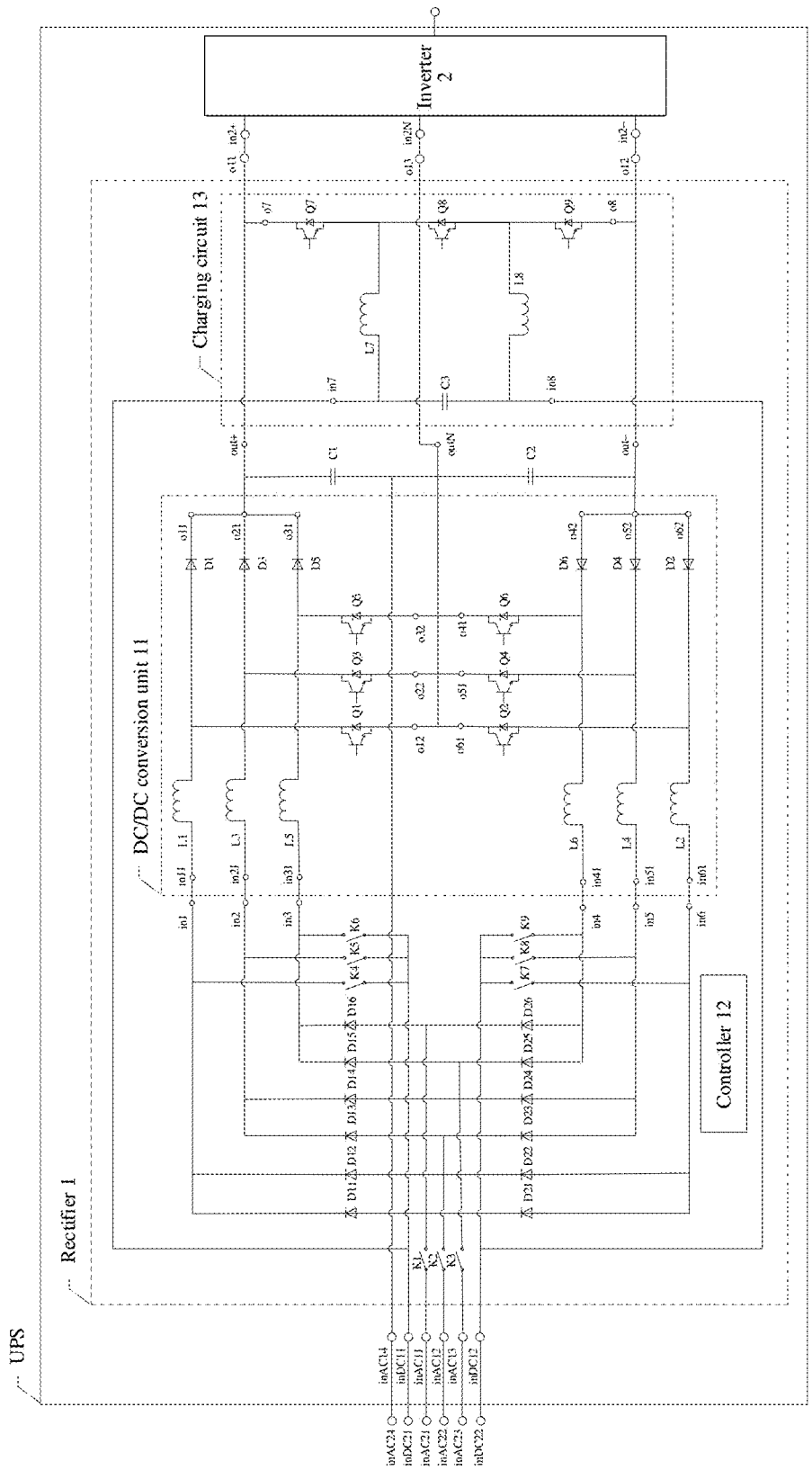
FIG. 7 is a schematic diagram of yet another structure of a UPS according to the embodiments.

FIG. 7 is a schematic diagram of still another structure of a UPS according to the embodiments. As shown in FIG. 7, compared with the UPS shown in FIG. 5, the UPS shown in FIG. 7 includes an additional charging circuit 13. A positive input end in7 and a negative input end in8 of the charging circuit 13 are respectively connected to a positive direct current input end inDC11 and a negative direct current input end inDC12 of a rectifier 1. A positive output end o7 and a negative output end o8 of the charging circuit 13 are respectively connected to a positive output end out+ and a negative output end out− of a DC/DC conversion unit 11. The charging circuit 13 includes a first inductor L7, a second inductor L8, a first switching transistor Q7, a second switching transistor Q8, a third switching transistor Q9, and a first capacitor C3. The first switching transistor Q7, the second switching transistor Q8, and the third switching transistor Q9 are sequentially connected in series between the positive output end o7 and the negative output end o8 of the charging circuit 13. One end of the first inductor L7 is connected to the positive input end in7 of the charging circuit 13, and the other end of the first inductor L7 is connected to a position at which the first switching transistor Q7 and the second switching transistor Q8 are connected in series. One end of the second inductor L8 is connected to the negative input end in8 of the charging circuit 13, and the other end of the second inductor L8 is connected to a position at which the second switching transistor Q8 and the third switching transistor Q9 are connected in series. The first capacitor C3 is connected between the positive input end in7 and the negative input end in8 of the charging circuit 13.

In an implementation, the UPS is in a mains mode. When detecting that an alternating-current-power-grid voltage of three phases of alternating current input ends inAC11, inAC12, and inAC13 is abnormal, a controller 12 controls controllable switching transistors in six DC/DC circuits in the DC/DC conversion unit 11 to turn off, so that the DC/DC conversion unit 11 stops operation, and controls alternating current side relays K1, K2, and K3 to turn off. In addition, when detecting that the alternating-current-power-grid voltage is abnormal, the controller 12 further controls the charging circuit 13 to operate, to control a direct current power supply to charge a positive bus capacitor C1 and a negative bus capacitor C2. After controlling the three alternating current side relays K1, K2, and K3 to turn off for first preset duration, the controller 12 controls six direct current side relays K4 to K9 to turn on, so that an input energy source of the UPS is switched from an alternating current power grid to the direct current power supply. After controlling the six direct current side relays K4 to K9 to turn on for second preset duration, that is, after ensuring that the six direct current side relays are reliably turned on, the controller 12 controls the controllable switching transistors in the six DC/DC circuits to turn on at a preset duty cycle, so that the DC/DC conversion unit 11 resumes operation, and the UPS is in a battery mode. After the DC/DC conversion unit 11 resumes operation, that is, after the UPS is in the battery mode, the controller 12 further controls the charging circuit 13 to stop operation, to control the direct current power supply to stop charging the positive bus capacitor C1 and the negative bus capacitor C2 by using the charging circuit 13.

After the UPS is in the battery mode, when detecting that the alternating-current-power-grid voltage of the three phases of alternating current input ends inAC11, inAC12, and inAC13 is within a preset voltage range, which indicates that the alternating-current-power-grid voltage recovers, the controller 12 controls the DC/DC conversion unit 11 to stop operation, and controls the six direct current side relays K4 to K9 to turn off. When detecting that the alternating-current-power-grid voltage recovers, the controller 12 further controls the charging circuit 13 to operate, so as to control the direct current power supply to charge the positive bus capacitor C1 and the negative bus capacitor C2 by using the charging circuit 13. After controlling the six direct current side relays K4 to K9 to turn off for third preset duration, that is, after ensuring that the six direct current side relays are reliably turned off, the controller 12 controls the three alternating current side relays K1 to K3 to be all turned on, so that the input energy source of the UPS is switched from the direct current power supply to the alternating current power grid. After the three alternating current side relays K1 to K3 are controlled to turn on for fourth preset duration, that is, it is ensured that the three alternating current side relays are reliably turned on, the controller 12 controls the DC/DC conversion unit 11 to resume operation, so that the UPS is in the mains mode. After the DC/DC conversion unit 11 resumes operation, that is, after the UPS is in the mains mode, the controller 12 further controls the charging circuit 13 to stop operation, to control the direct current power supply DC to stop charging the positive bus capacitor C1 and the negative bus capacitor C2. In the mains mode, three first DC/DC circuits increase a voltage of a direct current of the alternating-current-power-grid voltage rectified by six first rectifier diodes, and then charge the positive bus capacitor C1. Three second DC/DC circuits increase a voltage of a direct current of the alternating-current-power-grid voltage rectified by six second rectifier diodes, and then supply power to the negative bus capacitor C2. Therefore, the rectifier 11 outputs a direct current to an inverter 2 through the alternating current power grid connected to an alternating current input ends of the rectifier 11. It should be noted that duration consumed for switching a relay from turn-off to reliable turn-on may be the same as or different from duration consumed for switching the same relay from turn-on to reliable turn-off. This is not limited. For example, the third preset duration may be the same as or different from the second preset duration.

The controller 12 may control the charging circuit 13 to operate in the following manner: In each operation period of the charging circuit 13, after controlling the second switching transistor Q8 to turn on for fifth preset duration, the controller 12 controls the second switching transistor Q8 to turn off for sixth preset duration. The fifth preset duration and the sixth preset duration form one operation period of the charging circuit 13. The direct current power supply supplies power to the first inductor L7 and the second inductor L8 in the fifth preset duration, and the first inductor L7 and the second inductor L8 store energy. In the sixth preset duration, energy stored in the first inductor L7 and the second inductor L8 charges the positive bus capacitor C1 and the negative bus capacitor C2 through a current freewheeling loop formed by an anti-parallel diode of the first switching transistor Q7, the positive bus capacitor C1, the negative bus capacitor C2, an anti-parallel diode of the third switching transistor Q9, the second inductor L8, the first capacitor C3 (and the direct current power supply), and the first inductor L7. Herein, an operation period of the charging circuit 13 is an operation period of the second switching transistor Q8. In addition, the controller 12 may control the charging circuit 13 to stop operation, by controlling the second switching transistor Q8 to turn off.

Herein, for a specific implementation of control logic of the UPS other than logic of controlling the charging circuit 13, refer to the descriptions of corresponding parts in the UPS shown in FIG. 5. Details are not described herein again.

In addition, when the UPS is in the mains mode, the charging circuit 13 may be further configured to transfer energy stored in the positive bus capacitor C1 and the negative bus capacitor C2 to a direct current power supply connected to direct current input ends of the UPS, to charge the direct current power supply.

For example, the controller 12 may control, in each operation period of the charging circuit 13, the first switching transistor Q7 and the third switching transistor Q9 to be simultaneously turned on for ninth preset duration, and then control the first switching transistor Q7 and the third switching transistor Q9 to be simultaneously turned off for tenth preset duration. A sum of the ninth preset duration and the tenth preset duration is one operation period of the charging circuit 13. Herein, switching frequencies of the switching transistors in the charging circuit 13 may be the same. An operation period of the charging circuit 13 is an operation period of the first switching transistor Q7, that is, an operation period of the third switching transistor Q9. In the ninth preset duration, after energy stored in the positive bus capacitor C1 and the negative bus capacitor C2 flows out, the energy flows into the direct current power supply after sequentially passing through the first switching transistor Q7, the first inductor L7, the first capacitor C3, the second inductor L8, and the third switching transistor Q9, to transfer the energy stored in the positive bus capacitor C1 and the negative bus capacitor C2 to the direct current power supply. In the tenth preset duration, energy stored in the first inductor L7 and the second inductor L8 charges the direct current power supply through a current freewheeling loop formed by the first inductor L7, the direct current power supply, the second inductor L8, and an anti-parallel diode of the second switching transistor Q8.

In this embodiment, an input end of each DC/DC circuit in the DC/DC conversion unit 11 uses a circuit structure in which two phases of alternating current input ends of the rectifier 1 are connected by using two rectifier diodes respectively, so that each phase of alternating current of the alternating current power grid, after being rectified by the rectifier diode, can be output by using two DC/DC circuits that operate in interleaved and parallel connection. Therefore, a rated current of an inductor, a power switching transistor, and a power diode in the DC/DC circuit is reduced, and circuit costs of the rectifier 1 are reduced, to reduce circuit costs of the UPS. In addition, the UPS uses a structure of a relay and a rectifier diode as a mode switching circuit. The mode switching circuit does not need an additional drive circuit, and a loss of the relay and the rectifier diode is relatively small. Therefore, circuit costs and a volume of the UPS can be further effectively reduced. In addition, the UPS may further control the original charging circuit to implement reverse charging on the positive bus capacitor C1 and the negative bus capacitor C2, so that the output voltage of a rectifier 1 is not decreased by the load in the process in which the rectifier 1 switches between the foregoing two modes. This is to improve stability of the rectifier 1 during power supply and improve stability of the UPS during power supply. Compared with a manner in which a quantity of bus capacitors is increased to avoid a drop of the output voltage of the rectifier 1, a manner, provided in the embodiments, in which the charging circuit performs reverse charging to avoid a drop of the output voltage of the rectifier 1 can further reduce circuit costs and a volume of the rectifier 1, and further reduce circuit costs and the volume of the UPS.

Figure 8:
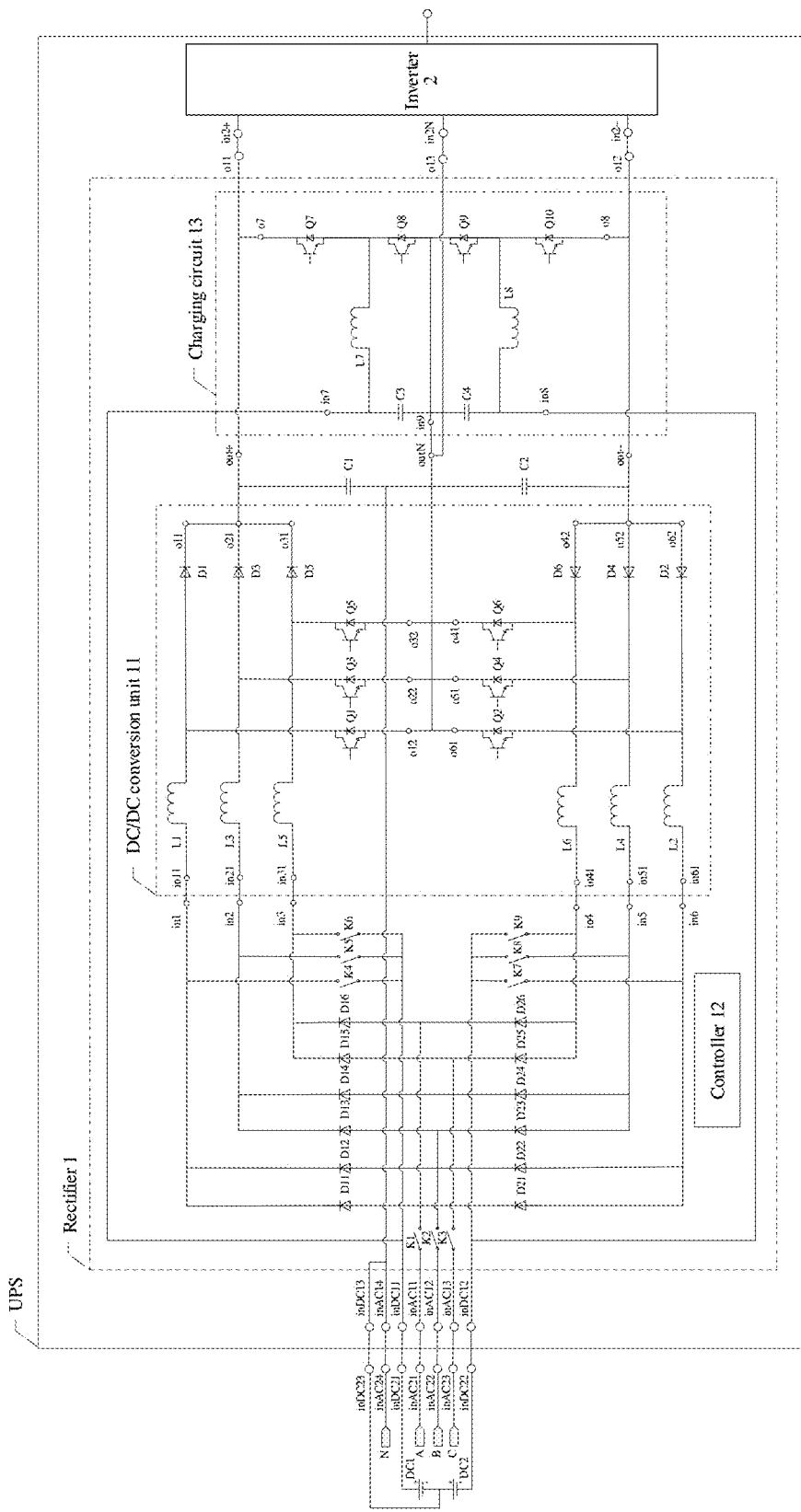
FIG. 8 is a schematic diagram of still yet another structure of a UPS according to the embodiments.

FIG. 8 is a schematic diagram of yet another structure of a UPS according to the embodiments. As shown in FIG. 8, compared with the UPS shown in FIG. 7, direct current input ends of the UPS shown in FIG. 8 include an additional neutral wire direct current input end inDC23, direct current input ends of a rectifier 1 include an additional neutral wire direct current input end inDC13, and a charging circuit 13 includes an additional second capacitor C4 and a fourth switching transistor Q10. A circuit structure of the charging circuit 13 also changes. For example, a positive input end in7, a negative input end in8, and a neutral wire input end in9 of the charging circuit 13 are respectively connected to a positive direct current input end inDC11, a negative direct current input end inDC12, and the neutral wire direct current input end inDC13 of the rectifier 1. A positive direct current input end inDC21 and a negative direct current input end inDC22 of the UPS are respectively connected to a positive pole of a direct current power supply DC1 and a negative pole of a direct current power supply DC2. A neutral wire direct current input end inDC23 of the UPS is connected to a negative pole of the direct current power supply DC1 and a positive pole of the direct current power supply DC2, and the neutral wire direct current input end inDC23 of the UPS is connected to the neutral wire direct current input end of the rectifier 1. A positive output end o7 and a negative output end o8 of the charging circuit 13 are respectively connected to a positive output end out+ and a negative output end out− of a DC/DC conversion unit 11.

The charging circuit 13 includes a first inductor L7, a second inductor L8, a first switching transistor Q7, a second switching transistor Q8, a third switching transistor Q9, a fourth switching transistor Q10, a first capacitor C3, and a second capacitor C4. The first switching transistor Q7, the second switching transistor Q8, the third switching transistor Q9, and the fourth switching transistor Q10 are sequentially connected in series between the positive output end o7 and the negative output end o8 of the charging circuit 13. One end of the first inductor L7 is connected to the positive input end in7 of the charging circuit 13, and the other end of the first inductor L7 is connected to a position at which the first switching transistor Q7 and the second switching transistor Q8 are connected in series. One end of the second inductor L8 is connected to the negative input end in8 of the charging circuit 13, and the other end of the second inductor L8 is connected to a position at which the third switching transistor Q9 and the fourth switching transistor Q10 are connected in series. The first capacitor C3 is connected between the positive input end in7 and the neutral wire input end in9 of the charging circuit 13, and the second capacitor C4 is connected between the neutral wire input end in9 and the negative input end in8 of the charging circuit 13. The neutral wire input end in9 of the charging circuit 13 is connected to a position at which the second switching transistor Q8 and the third switching transistor Q9 are connected in series, and the neutral wire input end in9 of the charging circuit 13 is further connected to a neutral wire output end outN of the DC/DC conversion unit 11.

In an operating principle of the UPS shown in FIG. 8, control logic of parts other than specific control modes for causing the charging circuit 13 to operate and stop operation is the same as control logic of the UPS shown in FIG. 7. Details are not described herein again.

Herein, a control mode of the charging circuit 13 is as follows: In each operation period of the charging circuit 13, a controller 12 may control the second switching transistor Q8 to turn on for fifth preset duration and then to turn off for sixth preset duration, and control the third switching transistor Q9 to turn on for seventh preset duration and then to turn off for eighth preset duration, so that the charging circuit 13 operates.

One operation period of the charging circuit 13 includes the fifth preset duration and the sixth preset duration, or includes the seventh preset duration and the eighth preset duration. In the fifth preset duration in which the second switching transistor Q8 is turned on, the direct current power supply DC1 supplies power to the first inductor L7, and the first inductor L7 stores energy. In the sixth preset duration in which the second switching transistor Q8 is turned off, energy stored in the first inductor L7 charges a positive bus capacitor C1 through a current freewheeling loop formed by an anti-parallel diode of the first switching transistor Q7, the positive bus capacitor C1, the first capacitor C3, the direct current power supply DC1, and the first inductor L7.

In the seventh preset duration in which the third switching transistor Q9 is turned on, the direct current power supply DC2 supplies power to the second inductor L8, and the second inductor L8 stores energy. In the eighth preset duration in which the third switching transistor Q9 is turned off, energy stored in the second inductor L8 charges a negative bus capacitor C2 through a current freewheeling loop formed by the second capacitor C4, the direct current power supply DC2, the negative bus capacitor C2, an anti-parallel diode of the fourth switching transistor Q10, and the second inductor L8. Herein, an operation period of the charging circuit 13 is an operation period of the second switching transistor Q8, that is, an operation period of the third switching transistor Q9. In addition, the controller 12 may control the charging circuit 13 to stop operation, by controlling both the second switching transistor Q8 and the third switching transistor Q9 to turn off.

It should be noted that the fifth preset duration may be the same as or different from the seventh preset duration. The sixth preset duration may be the same as or different from the eighth preset duration.

In addition, when the UPS is in a mains mode, the charging circuit 13 may be further configured to transfer energy stored in the positive bus capacitor C1 and the negative bus capacitor C2 to a direct current power supply connected to the direct current input ends of the UPS, to charge the direct current power supply.

For example, the controller 12 may control, in each operation period of the charging circuit 13, the first switching transistor Q7 to turn on for ninth preset duration, and then control the first switching transistor Q7 to turn off for tenth preset duration. A sum of the ninth preset duration and the tenth preset duration is one operation period of the charging circuit 13. An operation period of the charging circuit 13 is an operation period of the first switching transistor Q7. In the ninth preset duration, after energy stored in the positive bus capacitor C1 flows out, the energy flows into the direct current power supply DC1 after sequentially passing through the first switching transistor Q7, the first inductor L7, and the first capacitor C3, to transfer the energy stored in the positive bus capacitor C1 to the direct current power supply DC1. In the tenth preset duration, energy stored in the first inductor L7 charges the direct current power supply DC1 through a current freewheeling loop formed by the first inductor L7, the direct current power supply DC1, and an anti-parallel diode of the second switching transistor Q8. Herein, a control mode in which the negative bus capacitor C2 charges the direct current power supply DC2 is the same as a control mode in which the positive bus capacitor C1 charges the direct current power supply DC1. Details are not described herein again.

In this embodiment, an input end of each DC/DC circuit in the DC/DC conversion unit 11 uses a circuit structure in which two phases of alternating current input ends of the rectifier 1 are connected by using two rectifier diodes respectively, so that each phase of alternating current of the alternating current power grid, after being rectified by the rectifier diode, can be output by using two DC/DC circuits that operate in interleaved and parallel connection. Therefore, a rated current of an inductor, a power switching transistor, and a power diode in the DC/DC circuit is reduced, and circuit costs of the rectifier 1 are reduced, to reduce circuit costs of the UPS. In addition, the UPS uses a structure of a relay and a rectifier diode as a mode switching circuit. The mode switching circuit does not need an additional drive circuit, and a loss of the relay and the rectifier diode is relatively small. Therefore, circuit costs of the UPS can be further effectively reduced. In addition, the UPS may further control the original charging circuit to implement reverse charging on the positive bus capacitor C1 and the negative bus capacitor C2, so that an output voltage of a rectifier 1 is not decreased by a load in a process in which the rectifier 1 switches between the foregoing two modes. This is to improve stability of the rectifier 1 during power supply and improve stability of the UPS during power supply. Compared with a manner in which a quantity of bus capacitors is increased to avoid a drop of the output voltage of the rectifier 1, a manner, provided in the embodiments, in which the charging circuit performs reverse charging to avoid a drop of the output voltage of the rectifier 1 can further reduce circuit costs and a volume of the UPS. Additionally, the UPS provided in this embodiment is applicable to a circuit structure with three direct current input ends, and the UPS has various structures and high flexibility.

The input end of each DC/DC circuit in the rectifier 1 shown in FIG. 4 to FIG. 8 is connected to two phases of alternating current input ends of the rectifier 1 by using two rectifier diodes. When a connection manner in which the input end of each DC/DC circuit in the rectifier 1 shown in FIG. 4 to FIG. 8 is connected to two phases of alternating current input ends of the rectifier 1 by using two rectifier diodes is replaced with a connection manner in which the input end of each DC/DC circuit in the rectifier 1 is connected to one phase of alternating current input end of the rectifier 1 by using one rectifier diode, it still takes 10 ms to 20 ms to turn off or turn on the relay. Therefore, in a process in which the UPS switches between the mains mode and a battery mode, neither the alternating current power grid nor the direct current power supply can supply power to the positive bus capacitor C1 and the negative bus capacitor C2. Consequently, the rectifier 11 shuts down due to an excessively low output voltage, and the load is powered off. As a result, the UPS cannot work properly. To resolve this problem, currently, a quantity of bus capacitors is increased to prevent the output voltage of the rectifier 1 from being decreased by the load in the process in which the rectifier 1 switches between the foregoing two modes, to improve stability of the rectifier 1 during power supply and improve stability of the UPS during power supply. However, this manner causes an increase in circuit costs and volume of the UPS.

Based on this, the embodiments provide a UPS. The UPS may control a charging circuit inside the UPS to implement reverse charging on a positive bus capacitor C1 and a negative bus capacitor C2 by a direct current power supply, so that an output voltage of a rectifier 1 is not decreased by a load in a process in which the rectifier 1 switches between the foregoing two modes. This is to improve stability of the rectifier 1 during power supply and improve stability of the UPS during power supply.

Figure 9:
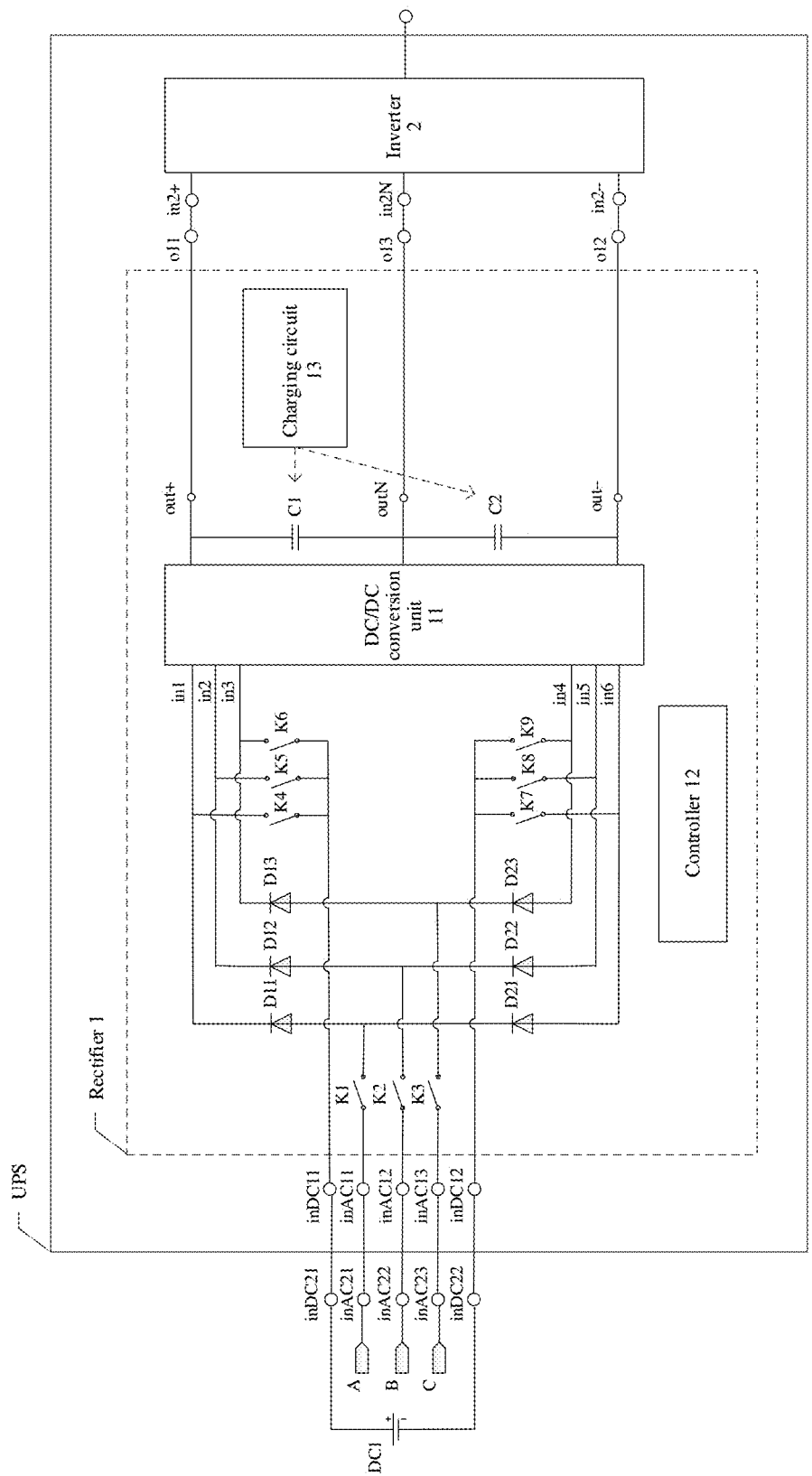
FIG. 9 is a schematic diagram of a further structure of a UPS according to the embodiments.

FIG. 9 is a schematic diagram of still yet another structure of a UPS according to the embodiments. As shown in FIG. 9, the UPS includes alternating current input ends (corresponding to alternating current input ends inAC21, inAC22, and inAC23 shown in FIG. 9), direct current input ends (corresponding to direct current input ends inDC21 and inDC22 shown in FIG. 9), a rectifier 1, an inverter 2, and an alternating current output end. The alternating current input ends inAC11, inAC12, and inAC13 of the UPS are respectively connected to a phase A, a phase B, and a phase C of an alternating current power grid. The direct current input ends inDC21 and inDC22 of the UPS are respectively connected to a positive pole and a negative pole of a direct current power supply DC. The alternating current input ends inAC21, inAC22, and inAC23 of the UPS are respectively connected to three phases of alternating current input ends inAC11, inAC12, and inAC13 of the rectifier 1. The direct current input ends inDC21 and inDC22 of the UPS are respectively connected to direct current input ends inDC11 and inDC12 of the rectifier 1. An output end of the rectifier 1 is connected to an input end of the inverter 2. An output end of the inverter 2 is connected to the alternating current output end of the UPS. The rectifier 1 includes three first rectifier diodes (corresponding to first rectifier diodes D11, D12, and D13 shown in FIG. 9), three second rectifier diodes (corresponding to second rectifier diodes D21, D22, and D23 shown in FIG. 9), three alternating current side relays (corresponding to alternating current side relays K1, K2, and K3 shown in FIG. 9), six direct current side relays (corresponding to direct current side relays K4, K5, K6, K7, K8, and K9 shown in FIG. 9), a DC/DC conversion unit 11, a positive bus capacitor C1, a negative bus capacitor C2, a controller 12, and a charging circuit 13.

Each of the three phases of alternating current input ends is connected to one end of one of the three alternating current side relays, and the three phases of alternating current input ends are in a one-to-one correspondence with the three alternating current side relays. The other end of each of the three alternating current side relays is connected to an anode of one first rectifier diode, and a cathode of the one first rectifier diode is connected to one phase of positive input end in three phases of positive input ends of the DC/DC conversion unit 11. One first rectifier diode connected to any alternating current side relay in the three alternating current side relays is different from one first rectifier diode connected to each alternating current side relay in the three alternating current side relays other than the any alternating current side relay. One phase of positive input end of the DC/DC conversion unit 11 that is connected to any alternating current side relay through one first rectifier diode is different from one phase of positive input end of the DC/DC conversion unit 11 that is connected to each alternating current side relay in the three alternating current side relays other than the any alternating current side relay. For example, the one phase of alternating current input end inAC11 of the rectifier 1 is connected to one end of the alternating current side relay K1, the other end of the alternating current side relay K1 is connected to an anode of the first rectifier diode D11, and a cathode of the first rectifier diode D11 is connected to one phase of positive input end in1 of the DC/DC conversion unit 11. The one phase of alternating current input end inAC12 of the rectifier 1 is connected to one end of the alternating current side relay K2, the other end of the alternating current side relay K2 is connected to an anode of the first rectifier diode D12, and a cathode of the first rectifier diode D12 is connected to one phase of positive input end in2 of the DC/DC conversion unit 11. The one phase of alternating current input end inAC13 of the rectifier 1 is connected to one end of the alternating current side relay K3, the other end of the alternating current side relay K3 is connected to an anode of the first rectifier diode D13, and a cathode of the first rectifier diode D13 is connected to one phase of positive input end in3 of the DC/DC conversion unit 11.

The other end of each of the three alternating current side relays is further connected to a cathode of one second rectifier diode, and an anode of the one second rectifier diode is connected to one phase of negative input end in the three phases of negative input ends of the DC/DC conversion unit 11. One second rectifier diode connected to any alternating current side relay is different from one second rectifier diode connected to each alternating current side relay in the three alternating current side relays other than the any alternating current side relay. One phase of negative input end of the DC/DC conversion unit 11 that is connected to any alternating current side relay through one second rectifier diode is different from one phase of negative input end of the DC/DC conversion unit 11 that is connected to each alternating current side relay in the three alternating current side relays other than the any alternating current side relay. For example, the other end of the alternating current side relay K1 is connected to a cathode of the second rectifier diode D21, and an anode of the second rectifier diode D21 is connected to one phase of negative input end in6 of the DC/DC conversion unit 11. The other end of the alternating current side relay K2 is connected to a cathode of the second rectifier diode D22, and an anode of the second rectifier diode D22 is connected to one phase of negative input end in5 of the DC/DC conversion unit 11. The other end of the alternating current side relay K3 is connected to a cathode of the second rectifier diode D23, and an anode of the second rectifier diode D23 is connected to one phase of negative input end in4 of the DC/DC conversion unit 11.

Each phase of input end in the three phases of positive input ends in1, in2, and in3 and the three phases of negative input ends in6, in5, and in4 of the DC/DC conversion unit 11 is connected to the direct current input end of the rectifier 1 through one of the direct current side relays K4, K5, K6, K7, K8, and K9. For example, the three phases of positive input ends in1, in2, and in3 of the DC/DC conversion unit 11 are connected to the direct current input end inDC11 of the rectifier 1 through the direct current side relays K4, K5, and K6 respectively, and the three phases of negative input ends in6, in5, and in4 of the DC/DC conversion unit 11 are connected to the direct current input end inDC12 of the rectifier 1 through the direct current side relays K7, K8, and K9 respectively. The positive output end out+, the negative output end out−, and a neutral wire output end outN of the DC/DC conversion unit 11 are respectively connected to output ends o11, o12, and o13 of the rectifier 1.

The positive bus capacitor C1 is connected between the positive output end out+ and the neutral wire output end outN of the DC/DC conversion unit 11, and the negative bus capacitor C2 is connected between the neutral wire output end outN and the negative output end out− of the DC/DC conversion unit. The charging circuit 13 is configured to control the direct current power supply DC to charge the positive bus capacitor C1 and the negative bus capacitor C2.

In an implementation, when an alternating-current-power-grid voltage of the three phases of alternating current input ends inAC11, inAC12, and inAC13 is abnormal, the controller 12 controls the charging circuit 13 to operate, and the DC/DC conversion unit 11 to stop operation, and controls the alternating current side relays K1, K2, and K3 to turn off. After controlling the alternating current side relays K1, K2, and K3 to turn off for first preset duration, the controller 12 controls the six direct current side relays K4 to K9 to turn on. After controlling the six direct current side relays K4 to K9 to turn on for second preset duration, the controller 12 controls the DC/DC conversion unit 11 to resume operation, and the charging circuit 13 to stop operation.

In this embodiment, the UPS may further control the original charging circuit 13 to implement reverse charging on the positive bus capacitor C1 and the negative bus capacitor C2, so that an output voltage of a rectifier 1 is not decreased by a load in a process in which the rectifier 1 switches between the foregoing two modes. This is to improve stability of the rectifier 1 during power supply and improve stability of the UPS during power supply. Compared with a manner in which a quantity of bus capacitors is increased to avoid a drop of the output voltage of the rectifier 1, a manner, provided in the embodiments, in which the charging circuit 13 performs reverse charging to avoid a drop of the output voltage of the rectifier 1 can effectively reduce circuit costs and a volume of the rectifier 1, and further reduce circuit costs and the volume of the UPS.

The DC/DC conversion circuit 11 shown in FIG. 9 may include three first DC/DC circuits and three second DC/DC circuits. For a specific implementation circuit of the DC/DC conversion unit 11 including the three first DC/DC circuits and the three second DC/DC circuits, refer to the descriptions of the DC/DC conversion unit 11 shown in FIG. 4. Details are not described herein again. The foregoing six DC/DC circuits may be BOOST circuits or other voltage increasing circuits. For ease of description, the following describes a circuit structure and an operating principle of the UPS by using an example in which the DC/DC circuit in the DC/DC conversion unit 11 is a BOOST circuit.

Figure 10:
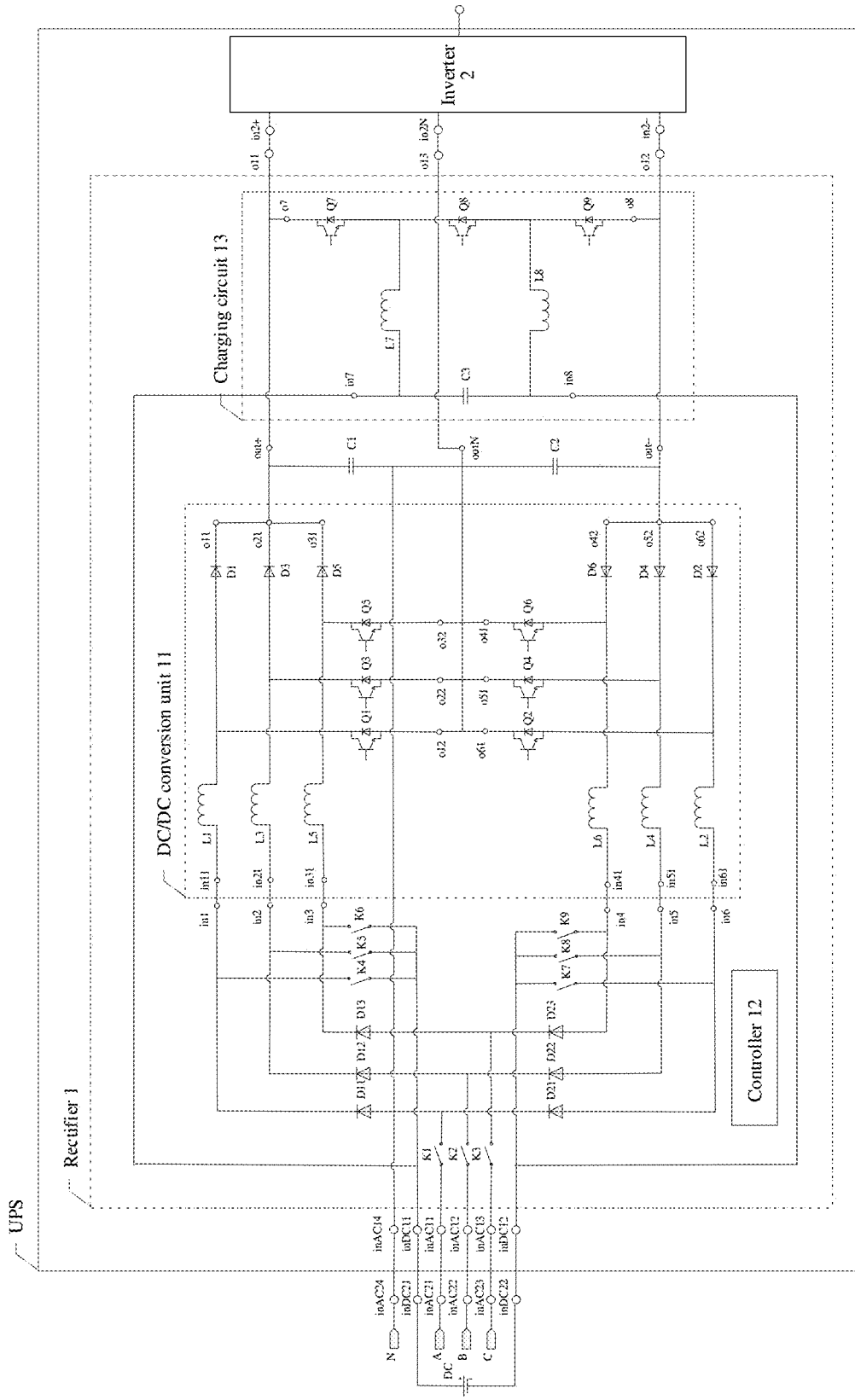
FIG. 10 is a schematic diagram of a still further structure of a UPS according to the embodiments.

FIG. 10 is a schematic diagram of a further structure of a UPS according to the embodiments. As shown in FIG. 10, the UPS further includes a neutral wire alternating current input end inAC24. The neutral wire alternating current input end inAC24 is connected to a neutral point N of an alternating current power grid. Alternating current input ends of the rectifier 1 further includes an alternating current input end inAC14. The alternating current input end inAC14 is connected to the neutral wire alternating current input end inAC24 and a neutral wire output end outN of a DC/DC conversion unit 11. Three first rectifier diodes (corresponding to first rectifier diodes D11, D12, and D13 shown in FIG. 10), three second rectifier diodes (corresponding to second rectifier diodes D21, D22, and D23 shown in FIG. 10), three alternating current side relays (corresponding to alternating current side relays K1, K2, and K3 shown in FIG. 10), six direct current side relays (corresponding to direct current side relays K4, K5, K6, K7, K8, and K9 shown in FIG. 10), the DC/DC conversion unit 11, a positive bus capacitor C1, a negative bus capacitor C2, a controller 12, and a charging circuit 13 are included. Herein, for a specific connection relationship between the three first rectifier diodes, the three second rectifier diodes, the three alternating current side relays, and the six direct current side relays, refer to the descriptions of corresponding parts in the UPS shown in FIG. 9. For a specific internal circuit structure and a connection relationship of the DC/DC conversion unit 11 and the charging circuit 13, refer to the descriptions of corresponding parts in the UPS shown in FIG. 7. Details are not described herein again.

In an implementation, the UPS is in a mains mode. When an alternating-current-power-grid voltage of three phases of alternating current input ends inAC11, inAC12, and inAC13 is abnormal, the controller 12 controls the DC/DC conversion unit 11 to stop operation, and controls the alternating current side relays K1, K2, and K3 to turn off. In addition, when detecting that the alternating-current-power-grid voltage is abnormal, the controller 12 further controls the charging circuit 13 to operate, to control a direct current power supply DC to charge the positive bus capacitor C1 and the negative bus capacitor C2. After controlling the three alternating current side relays K1, K2, and K3 to turn off for first preset duration, that is, after ensuring that the three alternating current side relays are reliably turned off, the controller 12 controls the six direct current side relays K4 to K9 to turn on, so that an input energy source of the rectifier 1 is switched from the alternating current power grid to the direct current power supply DC. After controlling the six direct current side relays K4 to K9 to turn on for second preset duration, that is, after ensuring that the six direct current side relays are reliably turned on, the controller 12 controls the DC/DC conversion unit 11 resumes operation, so that the UPS is in a battery mode. After the DC/DC conversion unit 11 resumes operation, that is, after the UPS is in the battery mode, the controller 12 further controls the charging circuit 13 to stop operation, to control the direct current power supply DC to stop charging the positive bus capacitor C1 and the negative bus capacitor C2 by using the charging circuit 13.

After the UPS is in the battery mode, when detecting that the alternating-current-power-grid voltage of the three phases of alternating current input ends inAC11, inAC12, and inAC13 is within a preset voltage range, which indicates that the alternating-current-power-grid voltage recovers, the controller 12 controls the DC/DC conversion unit 11 to stop operation, and controls the six direct current side relays K4 to K9 to turn off. When detecting that the alternating-current-power-grid voltage recovers, the controller 12 further controls the charging circuit 13 to operate, so as to control the direct current power supply DC to charge the positive bus capacitor C1 and the negative bus capacitor C2. After controlling the six direct current side relays K4 to K9 to turn off for third preset duration, that is, after ensuring that the six direct current side relays are reliably turned off, the controller 12 controls the three alternating current side relays K1 to K3 to be all turned on, so that the input energy source of the UPS is switched from the direct current power supply DC to the alternating current power grid. After the three alternating current side relays K1 to K3 are controlled to turn on for fourth preset duration, that is, it is ensured that the three alternating current side relays are reliably turned on, the controller 12 controls the DC/DC conversion unit 11 to resume operation, so that the UPS is in the mains mode. After the DC/DC conversion unit 11 resumes operation, that is, after the UPS is in the mains mode, the controller 12 further controls the charging circuit 13 to stop operation, to control the direct current power supply DC to stop charging the positive bus capacitor C1 and the negative bus capacitor C2. In the mains mode, three first DC/DC circuits increase a voltage of a direct current of the alternating-current-power-grid voltage rectified by three first rectifier diodes, and then charge the positive bus capacitor C1. Three second DC/DC circuits increase a voltage of a direct current of the alternating-current-power-grid voltage rectified by three second rectifier diodes, and then supply power to the negative bus capacitor C2. Therefore, the UPS outputs a direct current to an inverter 2 through the alternating current power grid connected to alternating current input ends of the UPS.

Herein, for a specific implementation of an operating principle of the UPS shown in FIG. 10, refer to the descriptions of corresponding parts in the UPS shown in FIG. 7. Details are not described herein again.

In this embodiment, the UPS may further control the original charging circuit to implement reverse charging on the positive bus capacitor C1 and the negative bus capacitor C2, so that an output voltage of the rectifier 1 is not decreased by a load in a process in which the rectifier 1 switches between the foregoing two modes. This is to improve stability of the rectifier 1 during power supply and improve stability of the UPS during power supply. Compared with a manner in which a quantity of bus capacitors is increased to avoid a drop of the output voltage of the rectifier 1, a manner, provided in the embodiments, in which the charging circuit performs reverse charging to avoid a drop of the output voltage of the rectifier 1 can effectively reduce circuit costs and a volume of the rectifier 1, and further effectively reduce circuit costs and a volume of the UPS.

Figure 11:
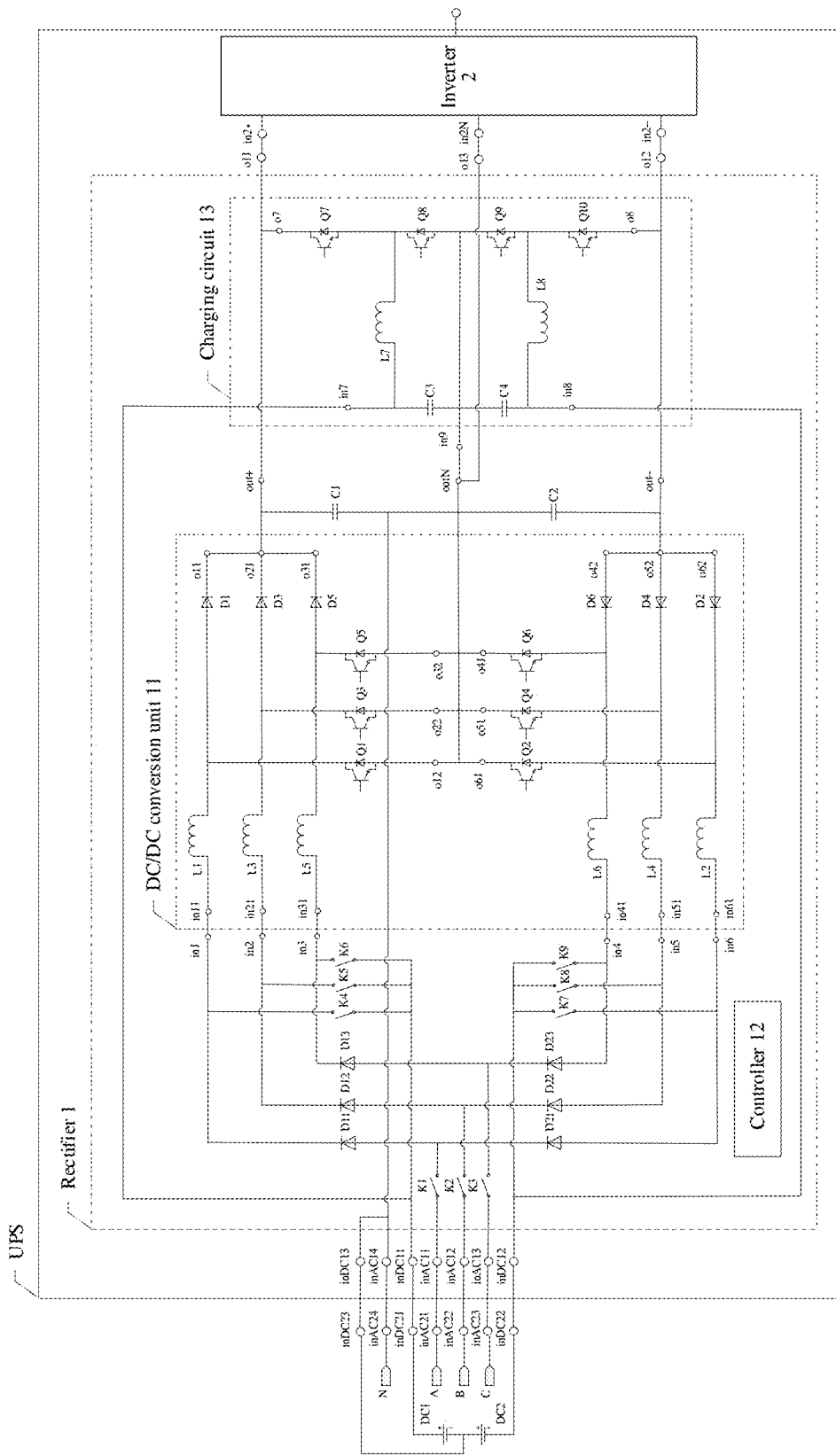
FIG. 11 is a schematic diagram of a yet further structure of a UPS according to the embodiments.

FIG. 11 is a schematic diagram of a still further structure of a UPS according to the embodiments. As shown in FIG. 11, compared with the UPS shown in FIG. 10, direct current input ends of the UPS shown in FIG. 11 include an additional neutral wire direct current input end inDC23, direct current input ends of a rectifier 1 include an additional neutral wire direct current input end inDC13, and a charging circuit 13 includes an additional second capacitor C4 and a fourth switching transistor Q10. A circuit structure of the charging circuit 13 also changes. Herein, for circuit elements in the charging circuit 13 and a connection relationship thereof, and a connection relationship between three direct current input ends of the rectifier 1 and a direct current power supply, refer to the descriptions of corresponding parts in the UPS shown in FIG. 8. Details are not described herein again.

Herein, in an operating principle of the UPS shown in FIG. 11, control logic of parts other than specific control modes for causing the charging circuit 13 to operate and stop operation is the same as control logic of the UPS shown in FIG. 10. Details are not described herein again. In the UPS shown in FIG. 11, for a specific implementation in which a controller 12 controls the charging circuit 13 to operate and stop operation, refer to the descriptions of corresponding parts in the UPS shown in FIG. 8. Details are not described herein again.

In this embodiment, the UPS may control the original charging circuit to implement reverse charging on a positive bus capacitor C1 and a negative bus capacitor C2, so that an output voltage of the rectifier 1 is not decreased by a load in a process in which the rectifier 1 switches between the foregoing two modes. This is to improve stability of the rectifier 1 during power supply and improve stability of the UPS during power supply. Compared with a manner in which a quantity of bus capacitors is increased to avoid a drop of the output voltage of the rectifier 1, a manner, provided in the embodiments, in which the charging circuit performs reverse charging to avoid a drop of the output voltage of the rectifier 1 can effectively reduce circuit costs and a volume of the rectifier 1, and further effectively reduce circuit costs and a volume of the UPS. In addition, the UPS provided in this embodiment is applicable to a circuit structure with three direct current input ends, and the UPS has various structures and high flexibility.

The embodiments further provide any one of rectifiers 1 shown in FIG. 3 to FIG. 5, FIG. 7, and FIG. 8. Herein, for a specific circuit structure and an operating principle of the rectifier 1, refer to the descriptions of the rectifiers 1 in FIG. 3 to FIG. 8. Details are not described herein again.

In this embodiment, an input end of each DC/DC circuit in a DC/DC conversion unit 11 uses a circuit structure in which two phases of alternating current input ends of the rectifier 1 are connected by using two rectifier diodes respectively, so that each phase of alternating current of an alternating current power grid, after being rectified by a rectifier diode, can be output by using two DC/DC circuits that operate in interleaved and parallel connection. Therefore, a rated current of an inductor, a power switching transistor, and a power diode in the DC/DC circuit is reduced, and circuit costs of the rectifier 1 are reduced. In addition, the rectifier 1 uses a structure of a relay and a rectifier diode as a mode switching circuit. The mode switching circuit does not need an additional drive circuit, and a loss of the relay and the rectifier diode is relatively small. Therefore, circuit costs of the rectifier 1 can be further effectively reduced. In addition, the rectifier 1 may further control an original charging circuit to implement reverse charging on a positive bus capacitor C1 and a negative bus capacitor C2, so that an output voltage of the rectifier 1 is not decreased by a load in a process in which the rectifier 1 switches between the foregoing two modes. This is to improve stability of the rectifier 1 during power supply.

Compared with a manner in which a quantity of bus capacitors is increased to avoid a drop of the output voltage of the rectifier 1, a manner, provided in the embodiments, in which the charging circuit performs reverse charging to avoid a drop of the output voltage of the rectifier 1 can further reduce circuit costs and a volume of the rectifier 1.

The embodiments further provide any one of rectifiers 1 shown in FIG. 9 to FIG. 11. Herein, for a specific circuit structure and an operating principle of the rectifier 1, refer to the descriptions of the rectifiers 1 in FIG. 9 to FIG. 11. Details are not described herein again.

In this embodiment, the rectifier 1 may control an original charging circuit to implement reverse charging on a positive bus capacitor C1 and a negative bus capacitor C2, so that an output voltage of the rectifier 1 is not decreased by a load in a process in which the rectifier 1 switches between the foregoing two modes. This is to improve stability of the rectifier 1 during power supply. Compared with a manner in which a quantity of bus capacitors is increased to avoid a drop of the output voltage of the rectifier 1, a manner, provided in the embodiments, in which the charging circuit performs reverse charging to avoid a drop of the output voltage of the rectifier 1 can effectively reduce circuit costs and a volume of the rectifier 1.

The foregoing descriptions are merely specific implementations of the embodiments, but are not intended as limiting. Any variation or replacement readily figured out by a person skilled in the art shall fall within the scope of the embodiments.

The invention claimed is:

1. An uninterruptible power supply comprising:
an alternating current output end;
an inverter, wherein an output end of the inverter is connected to the alternating current output end;
a rectifier, wherein an output end of the rectifier is connected to an input end of the inverter;
alternating current input ends, wherein the alternating current input ends are connected to three phases of alternating current input ends of the rectifier; and
direct current input ends, wherein the direct current input ends are configured to connect to a direct current power supply and connected to direct current input ends of the rectifier,
wherein the rectifier further comprises:
six first rectifier diodes,
six second rectifier diodes,
three alternating current side relays,
six direct current side relays,
a DC/DC conversion unit, and
a controller, wherein each phase of the three phases of alternating current input ends of the rectifier is connected to a first end of each relay of the three alternating current side relays, a second end of each relay of the three alternating current side relays is connected to anodes of two first rectifier diodes, cathodes of the two first rectifier diodes are respectively connected to two phases of positive input ends in three phases of positive input ends of the DC/DC conversion unit, the second end of each relay of the three alternating current side relays is further connected to cathodes of the two second rectifier diodes, anodes of the two second rectifier diodes are respectively connected to two phases of negative input ends in three phases of negative input ends of the DC/DC conversion unit, each phase of input end in the three phases of positive input ends and the three phases of negative input ends of the DC/DC conversion unit is connected to the direct current input end of the rectifier through one direct current side relay, an output end of the DC/DC conversion unit is connected to the output end of the rectifier, and the controller is configured to:
when a voltage of the three phases of alternating current input ends is abnormal, control the DC/DC conversion unit to stop operation, and control the three alternating current side relays to turn off;
after controlling the three alternating current side relays to turn off for a first preset duration, control the six direct current side relays to turn on; and
after controlling the six direct current side relays to turn on for a second preset duration, control the DC/DC conversion unit to resume operation.

2. The uninterruptible power supply according to claim 1, wherein the rectifier further comprises;
a positive bus capacitor,
a negative bus capacitor, and
a charging circuit, and the output end of the DC/DC conversion unit comprises:
a positive output end,
a negative output end, and
a neutral wire output end, wherein the positive bus capacitor is connected between the positive output end and the neutral wire output end of the DC/DC conversion unit, the negative bus capacitor is connected between the neutral wire output end and the negative output end of the DC/DC conversion unit, input ends of the charging circuit are connected to the direct current input ends of the rectifier, output ends of the charging circuit are respectively connected to the positive output end and the negative output end of the DC/DC conversion unit, and the charging circuit is configured to control the direct current power supply to charge the positive bus capacitor and the negative bus capacitor.

3. The uninterruptible power supply according to claim 2, wherein the controller is further configured to:
when the voltage of the three phases of alternating current input ends is abnormal, control the charging circuit to control the direct current power supply to charge the positive bus capacitor and the negative bus capacitor; and
after controlling the DC/DC conversion unit to resume operation, control the charging circuit to stop operation.

4. The uninterruptible power supply according to claim 1, wherein the controller is configured to:
after controlling the DC/DC conversion unit to stop operation, when an input current of the DC/DC conversion unit is less than or equal to a preset current threshold, control the three alternating current side relays to turn off.

5. The uninterruptible power supply according to claim 2, wherein the controller is configured to:
after controlling the DC/DC conversion unit to stop operation, when an input current of the DC/DC conversion unit is less than or equal to a preset current threshold, control the three alternating current side relays to turn off.

6. The uninterruptible power supply according to claim 2, wherein the controller is further configured to:
when the voltage of the three phases of alternating current input ends recovers, control the DC/DC conversion unit to stop operation, and control the six direct current side relays to turn off;
after controlling the six direct current side relays to turn off for a third preset duration, control the three alternating current side relays to turn on; and after controlling the three alternating current side relays to turn on for a fourth preset duration, control the DC/DC conversion unit to resume operation.

7. The uninterruptible power supply according to claim 3, wherein the controller is further configured to:
when the voltage of the three phases of alternating current input ends recovers, control the DC/DC conversion unit to stop operation, control the six direct current side relays to turn off;
after controlling the six direct current side relays to turn off for a third preset duration, control the three alternating current side relays to turn on; and
after controlling the three alternating current side relays to turn on for fourth preset duration, control the DC/DC conversion unit to resume operation.

8. The uninterruptible power supply according to claim 6, wherein the controller is further configured to:
when the voltage of the three phases of alternating current input ends recovers, control the charging circuit to control the direct current power supply to charge the positive bus capacitor and the negative bus capacitor; and
after controlling the DC/DC conversion unit to resume operation, control the charging circuit to stop operation.

9. The uninterruptible power supply according to claim 6, wherein the controller is configured to:
after controlling the DC/DC conversion unit to stop operation, when the input current of the DC/DC conversion unit is less than or equal to the preset current threshold, control the six direct current side relays to turn off.

10. The uninterruptible power supply according to claim 8, wherein the controller is configured to:
after controlling the DC/DC conversion unit to stop operation, when the input current of the DC/DC conversion unit is less than or equal to the preset current threshold, control the six direct current side relays to turn off.

11. The uninterruptible power supply according to claim 3, wherein the charging circuit comprises:
a first inductor,
a second inductor,
a first switching transistor,
a second switching transistor,
a third switching transistor, and
a first capacitor, wherein the input ends of the charging circuit comprise a positive input end and a negative input end, the output ends of the charging circuit comprise a positive output end and a negative output end, the direct current input ends of the rectifier comprise a positive direct current input end and a negative direct current input end, the positive input end and the negative input end of the charging circuit are respectively connected to the positive direct current input end and the negative direct current input end of the rectifier, the first switching transistor, the second switching transistor, and the third switching transistor are sequentially connected in series between the positive output end and the negative output end of the charging circuit, a first end of the first inductor is connected to the positive input end of the charging circuit, and a second end of the first inductor is connected to a position at which the first switching transistor and the second switching transistor are connected in series, a first end of the second inductor is connected to the negative input end of the charging circuit, a second end of the second inductor is connected to a position at which the second switching transistor and the third switching transistor are connected in series; and the first capacitor is connected between the positive input end and the negative input end of the charging circuit.

12. The uninterruptible power supply according to claim 3, wherein the charging circuit comprises:
a first inductor,
a second inductor,
a first switching transistor,
a second switching transistor,
a third switching transistor,
a fourth switching transistor,
a first capacitor, and
a second capacitor, wherein the input ends of the charging circuit comprise:
a positive input end,
a negative input end, and
a neutral wire input end, wherein the output ends of the charging circuit comprise a positive output end and a negative output end, the direct current input ends of the rectifier comprise a positive direct current input end, a negative direct current input end, and a neutral wire direct current input end, the positive input end, the negative input end, and the neutral wire input end of the charging circuit are respectively connected to the positive direct current input end, the negative direct current input end, and the neutral wire direct current input end of the rectifier, the first switching transistor, the second switching transistor, the third switching transistor, and the fourth switching transistor are sequentially connected in series between the positive output end and the negative output end of the charging circuit, a first end of the first inductor is connected to the positive input end of the charging circuit, and a second end of the first inductor is connected to a position at which the first switching transistor and the second switching transistor are connected in series, a first end of the second inductor is connected to the negative input end of the charging circuit, and a second end of the second inductor is connected to a position at which the third switching transistor and the fourth switching transistor are connected in series, the first capacitor is connected between the positive input end and the neutral wire input end of the charging circuit, the second capacitor is connected between the neutral wire input end and the negative input end of the charging circuit, the neutral wire input end of the charging circuit is connected to a position at which the second switching transistor and the third switching transistor are connected in series, and to the neutral wire output end of the DC/DC conversion unit.

13. An uninterruptible power supply, wherein the uninterruptible power supply comprises:
an alternating current output end;
an inverter, wherein an output end of the inverter is connected to the alternating current output end;
a rectifier, wherein an output end of the rectifier is connected to an input end of the inverter;
alternating current input ends, wherein the alternating current input ends are connected to three phases of alternating current input ends of the rectifier; and
direct current input ends, wherein the direct current input ends are configured to connect to a direct current power supply,
and the rectifier comprises:
three first rectifier diodes,
three second rectifier diodes, three alternating current side relays,
six direct current side relays,
a DC/DC conversion unit,
a positive bus capacitor,
a negative bus capacitor,
a charging circuit, and
a controller, wherein each phase of the three phases of alternating current input ends is connected to a first end of each relay of the three alternating current side relays, a second end of each relay of the three alternating current side relays is connected to an anode of one first rectifier diode, a cathode of the one first rectifier diode is connected to one phase of positive input end in three phases of positive input ends of the DC/DC conversion unit, the second end of each relay of the three alternating current side relays is further connected to a cathode of one second rectifier diode, an anode of the one second rectifier diode is connected to one phase of negative input end in the three phases of negative input ends of the DC/DC conversion unit, each phase of input end in the three phases of positive input ends and the three phases of negative input ends of the DC/DC conversion unit is connected to the direct current input end of the rectifier through one direct current side relay, a positive output end, a negative output end, and a neutral wire output end of the DC/DC conversion unit each are connected to the output end of the rectifier, the positive bus capacitor is connected between the positive output end and the neutral wire output end of the DC/DC conversion unit, the negative bus capacitor is connected between the neutral wire output end and the negative output end of the DC/DC conversion unit; the charging circuit is configured to control the direct current power supply to charge the positive bus capacitor and the negative bus capacitor; and the controller is configured to:
when a voltage of the three phases of alternating current input ends is abnormal, control the charging circuit to operate and the DC/DC conversion unit to stop operation, and control the three alternating current side relays to turn off;
after controlling the three alternating current side relays to turn off for a first preset duration, control the six direct current side relays to turn on; and
after controlling the six direct current side relays to turn on for a second preset duration, control the DC/DC conversion unit to resume operation, and control the charging circuit to stop operation.

14. The uninterruptible power supply according to claim 1, wherein the DC/DC conversion unit comprises three first DC/DC circuits and three second DC/DC circuits.

15. The uninterruptible power supply according to claim 14, wherein the three first DC/DC circuits are configured to increase a voltage of a direct current of an alternating-current-power-grid voltage rectified by three first rectifier diodes and the three second DC/DC circuits are configured to increase a voltage of a direct current of the alternating-current-power-grid voltage rectified by three second rectifier diodes.

16. The uninterruptible power supply according to claim 1, wherein the first preset duration is longer than or equal to a duration required for the alternating current side relay to switch from a turn-on state to a turn-off state.

17. The uninterruptible power supply according to claim 1, wherein the second preset duration is longer than or equal to a duration required for the direct current side relay to switch from a turn-off state to a turn-on state.

18. The uninterruptible power supply according to claim 2, wherein the uninterruptible power supply is configured to implement reverse charging on the positive bus capacitor and the negative bus capacitor.

19. The uninterruptible power supply according to claim 13, wherein the first preset duration is longer than or equal to a duration required for the alternating current side relay to switch from a turn-on state to a turn-off state.

20. The uninterruptible power supply according to claim 13, wherein the second preset duration is longer than or equal to a duration required for the direct current side relay to switch from a turn-off state to a turn-on state.

* * * * *